US007987284B2

(12) United States Patent
Ogawa et al.

(10) Patent No.: US 7,987,284 B2
(45) Date of Patent: Jul. 26, 2011

(54) COMMUNICATION PROCESSING APPARATUS, DATA COMMUNICATION SYSTEM, AND COMMUNICATION PROCESSING METHOD

(75) Inventors: Akimichi Ogawa, Kanagawa (JP); Tatsuya Igarashi, Tokyo (JP); Kazuhiro Shitama, Tokyo (JP); Seiji Miyama, Tokyo (JP)

(73) Assignee: Sony Corporation, Tokyo (JP)

( * ) Notice: Subject to any disclaimer, the term of this patent is extended or adjusted under 35 U.S.C. 154(b) by 934 days.

(21) Appl. No.: 11/385,770

(22) Filed: Mar. 22, 2006

(65) Prior Publication Data
US 2006/0218264 A1 Sep. 28, 2006

(30) Foreign Application Priority Data

Mar. 28, 2005 (JP) ................ P2005-092452

(51) Int. Cl.
*G06F 15/16* (2006.01)
(52) U.S. Cl. ........................ 709/233; 709/234
(58) Field of Classification Search .......... 709/230–235, 709/203; 370/229–235
See application file for complete search history.

(56) References Cited

U.S. PATENT DOCUMENTS

| 5,513,185 | A * | 4/1996 | Schmidt ................ 714/708 |
| 6,105,064 | A | 8/2000 | Davis et al. |
| 6,757,255 | B1 * | 6/2004 | Aoki et al. .............. 370/252 |
| 6,940,831 | B1 * | 9/2005 | Omi et al. ............... 370/310.1 |
| 2002/0053053 | A1 | 5/2002 | Nagai et al. |
| 2002/0071388 | A1 | 6/2002 | Bergsson et al. |
| 2002/0194361 | A1 * | 12/2002 | Itoh et al. .............. 709/233 |
| 2003/0103243 | A1 * | 6/2003 | Watanabe et al. ........ 358/405 |
| 2003/0103481 | A1 * | 6/2003 | Heo et al. ............... 370/335 |
| 2004/0044783 | A1 | 3/2004 | Nordberg |
| 2004/0153951 | A1 | 8/2004 | Walker et al. |
| 2004/0190452 | A1 | 9/2004 | Imiya et al. |
| 2004/0228353 | A1 * | 11/2004 | Balachandran et al. . 370/395.21 |
| 2005/0021830 | A1 * | 1/2005 | Urzaiz et al. ............. 709/234 |

(Continued)

FOREIGN PATENT DOCUMENTS

JP 11-072850 3/1999

(Continued)

OTHER PUBLICATIONS

Communication from Japanese Patent Office for Japanese Patent Application No. 2005-092452, dated May 12, 2008, 11 pages.

(Continued)

*Primary Examiner* — Andrew Caldwell
*Assistant Examiner* — Loi Tran
(74) *Attorney, Agent, or Firm* — Finnegan, Henderson, Farabow, Garrett & Dunner, L.L.P.

(57) ABSTRACT

A communication processing apparatus that acts as a server for transmitting data to a client includes a data transceiver configured to carry out communications with the client; a rate controller configured to control a bitrate of data transmitted to the client; and a data processor configured to prepare data to transmit in accordance with the bitrate. The rate controller includes a throughput calculator configured to extract an effective data transmission and reception period not including an ineffective data transmission and reception period in a period during which a communication connection is maintained between the server and the client, and to calculate a maximum throughput on the basis of the length of the effective data transmission and reception period and the amount of data transmitted; and a bitrate setter configured to set a bitrate within a range of up to a maximum allowable bitrate corresponding to the maximum throughput calculated by the throughput calculator.

27 Claims, 16 Drawing Sheets

U.S. PATENT DOCUMENTS

| | | | |
|---|---|---|---|
| 2005/0033857 A1 | 2/2005 | Imiya | |
| 2005/0053168 A1* | 3/2005 | Song et al. | 375/261 |
| 2005/0111485 A1* | 5/2005 | Bruckmann et al. | 370/465 |
| 2005/0286422 A1* | 12/2005 | Funato | 370/235 |
| 2007/0223383 A1* | 9/2007 | Kamath et al. | 370/236 |

FOREIGN PATENT DOCUMENTS

| | | |
|---|---|---|
| JP | 2000-216811 | 8/2000 |
| JP | 2000-270015 A | 9/2000 |
| JP | 2000-324176 | 11/2000 |
| JP | 2001-144802 | 5/2001 |
| JP | 2002-084339 A | 3/2002 |
| JP | 2002-204255 | 7/2002 |
| JP | 2002-204278 | 7/2002 |
| JP | 2004-193991 | 7/2004 |
| JP | 2004-260562 A | 9/2004 |
| JP | 2004-266741 | 9/2004 |
| JP | 2004-266741 A | 9/2004 |
| JP | 2004-297565 | 10/2004 |
| JP | 2005-005823 | 1/2005 |
| WO | WO 02/25878 A1 | 3/2002 |

OTHER PUBLICATIONS

Takashi Takeshita, Mastering TCP/IP, Beginner's edition, Ohm Co., Ltd., Third version, Feb. 25, 2002, pp. 195-215.

Koichi Yano, Rate control method based on the turnaround time suitable for real-time transfer of the continuous media, Institute of Electronics, Information and Communication Engineers technical study reports, vol. 98, No. 11, Corporate judicial person Institute of Electronics, Information and Communication Engineers, Apr. 23, 1998, pp. 85-90.

Phil Karn, et al.; "Improving Round-Trip Time Estimates in Reliable Transport Protocols"; ACM Transactions on Computer Systems; ACM; New York, NY; vol. 4; Nov. 1, 1991; pp. 364-373.

English Translation of Office Action issued on Jan. 11, 2011, in Japanese Patent Application No. 2008-297631.

Yano et al., "A Rate Control for Real-time Transmission of Continuous Media Based on Queue Length Estimation from end-to-end Delay," Canon, Inc., Media Technology Laboratory, 53, Imaikamichou, Nakahara-ku, Kawasaki-shi, Kanagawa 211-8501, Japan; Institute of Industrial Science, University of Tokyo, 7-22-1, Roppongi, Minato-ku, Tokyo 106-8558, Japan.

* cited by examiner

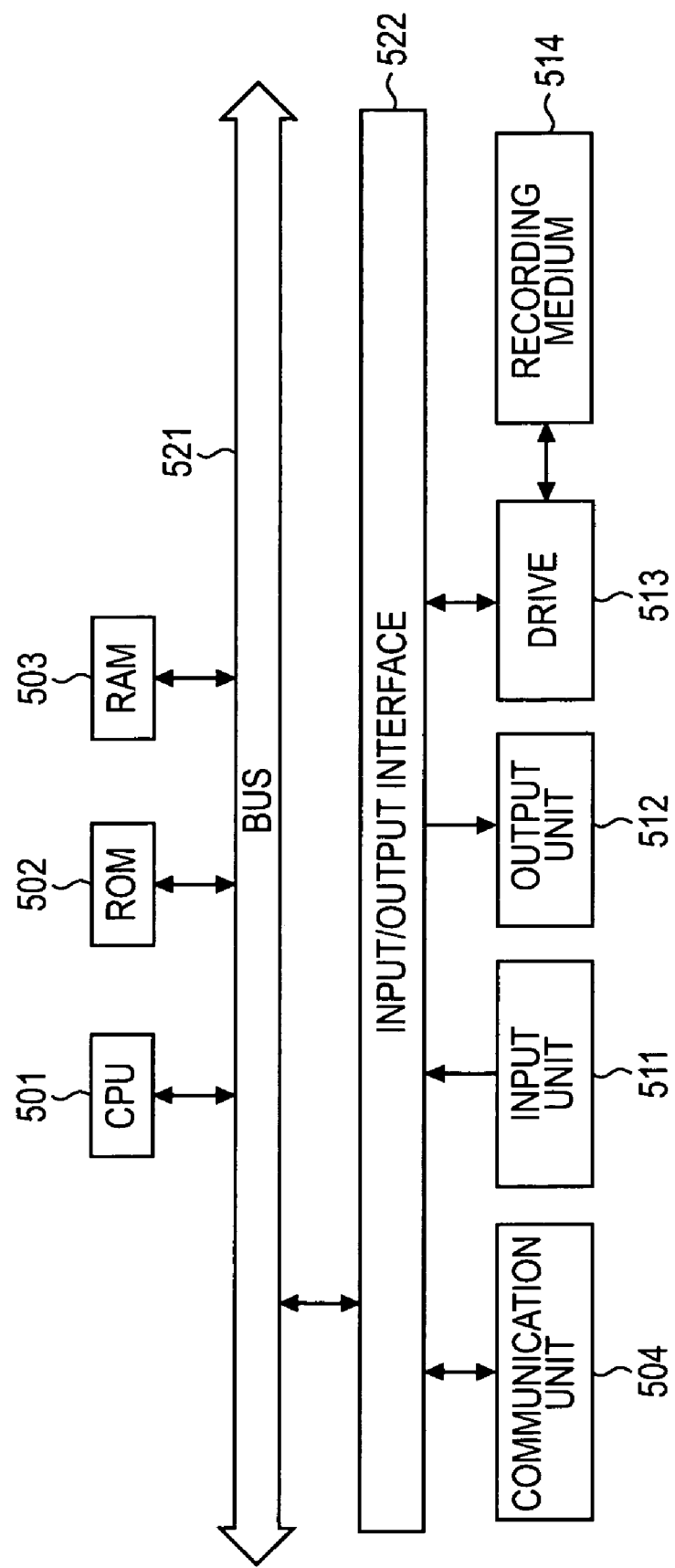

COMMUNICATION PROCESSING APPARATUS, DATA COMMUNICATION SYSTEM, AND COMMUNICATION PROCESSING METHOD

CROSS REFERENCES TO RELATED APPLICATIONS

The present invention contains subject matter related to Japanese Patent Application JP 2005-092452 filed in the Japanese Patent Office on Mar. 28, 2005, the entire contents of which are incorporated herein by reference.

BACKGROUND OF THE INVENTION

1. Field of the Invention

The present invention relates to communication processing apparatuses, data communication systems, and communication processing methods. More specifically, the present invention relates to a communication processing apparatus, a data communication system, and a communication processing method that allow appropriate bitrate control in transmission and reception of streaming data.

2. Description of the Related Art

Recently, data communications are actively being carried out over the Internet. Also, home networks that allow communications among devices connected via networks at homes, such as household electric appliances, computers, and peripheral devices, are becoming common. A home network allows, for example, transmission and reception of content among devices connected via a network. This is convenient and comfortable for users, so that home networks will become even more common.

In a type of data distribution that is called streaming or data streaming, image data held by a server is transmitted to a client via a network and the client plays back the image data while receiving the image data. A server that executes such streaming data distribution is referred to as a streaming server, and a client that receives data from the streaming server is referred to as a streaming client. The streaming server executes data processing such as encoding to generate data to transmit, and outputs the data to the network. The streaming client temporarily accumulates received data in a buffer, and sequentially decodes and plays back the data.

In many cases, a communication protocol called the Real Time Transport Protocol (RTP) is used in data streaming. Basically, RTP does not support retransmission control. That is, RTP is a protocol like the User Datagram Protocol (UDP), which does not define measures against packet loss or assurance of transmission time. Since retransmission is not executed even in case of a packet loss, delays due to retransmission do not occur. Thus, RTP is a protocol suitable for real-time playback.

In communications based on RTP, for example, a transmission rate is controlled according to the RTP Control Protocol (RTCP). For example, according to a method disclosed in Japanese Unexamined Patent Application Publication No. 2002-204278, an apparatus at a data receiving end reports a packet loss rate or the like to an apparatus at a data transmitting end in a receiver report (RR) packet of RTCP. This allows the apparatus at the data transmitting end to estimate the status of data transmission and to control the transmission rate.

In streaming distribution, it is desirable to distribute data at an optimal transmission rate. For example, according to a scheme disclosed in Japanese Unexamined Patent Application Publication No. 2004-297565, a data transmitting apparatus and a data receiving apparatus measure an upstream transmission rate and a downstream transmission rate, and a rate controlling apparatus exercises control so that data is transmitted and received at a smaller one of the rates measured, so that data can be transmitted stably.

An advantage of the streaming distribution based on RTP described above is that playback is not delayed since retransmission is not executed even in case of a packet loss. However, in order to improve data quality, it is desirable that a client receive complete data. Furthermore, when content distributed is encrypted content, loss of a data portion could prohibit decryption and therefore playback of content at the client. In the case of such content, a protocol that does not support retransmission control, such as RTP, is not suitable.

When the integrity of transferred data is desirable, a transport protocol that defines measures against packet loss, such as the Transmission Control Protocol (TCP), is used. A scheme of distribution of image data based on TCP is described, for example, in Japanese Unexamined Patent Application Publication No. 2005-005823.

Communications based on a transport protocol such as TCP are carried out on a best-effort basis. When streaming of multimedia data is carried out, variation in a communication bandwidth of best-effort communications poses a series problem. This problem is particularly apparent, for example, in the case of TCP. According to TCP, although loss of data does not occur, the arrival time of data is delayed when the communication bandwidth decreases. In streaming based on TCP, the delay in the data arrival time tends to cause video or audio interrupts when congestion occurs. In order to overcome this problem, usually, when a streaming server distributes data, the bitrate of data transmitted is increased or decreased in accordance with variation in the communication bandwidth. The method of increasing or decreasing a bitrate of multimedia data including video data or the like considerably affects the quality of data streaming.

It has hitherto been the case for a streaming server to determine whether to increase or decrease a bitrate of distributed data mainly on the basis of information supplied from a client. For example, information regarding the amount of data accumulated in an application buffer of the client is used. However, calculation of the amount of data accumulated in the application buffer of the client does not necessarily suffice to prevent transmitting data at a bitrate that is higher than a bitrate allowed by the network bandwidth. When data is transmitted at a bitrate higher than a bitrate allowed by the network bandwidth, congestion occurs. Thus, multimedia data does not arrive at the client as desired, and this causes an underrun of data accumulated in the application buffer of the client. This raises the possibility of audio or video interrupts.

Furthermore, according to the method based on information supplied from the client, it is not possible to quickly adapt to variation in the communication bandwidth. For example, when the communication bandwidth between the streaming server and the streaming client is decreased abruptly due to occurrence of other traffic or the like, the playback of data transmitted is not interrupted if the streaming server decreases the bitrate of data transmitted as soon as the communication bandwidth decreases. However, when information supplied from the client is used as in the case described above, the amount of data accumulated in the client buffer decreases when a certain time has elapsed since the decrease in the communication bandwidth. Thus, it takes some time for the server to recognize the decrease in the amount of buffer data, so that it is not possible for the server to adapt immediately to the decrease in the communication bandwidth. Thus, an underrun of the client buffer occurs before the server decreases the bitrate or takes other appropriate measures. This causes video or audio interrupts.

SUMMARY OF THE INVENTION

It is desirable to provide a communication processing apparatus, a data communication system, and a communication processing method that allow data to be transmitted in an optimal transmission mode in transmission and reception of streaming data.

More specifically, it is desirable to provide a communication processing apparatus, a data communication system, and a communication processing method with which a server predicts an optimal value of bitrate of data transmitted in consideration of factors such as congestion on a communication path or disturbance on a communication link and with which the bitrate is dynamically controlled on the basis of the predicted value so that data streaming is carried out in an optimal data transmission mode.

According to an embodiment of the present invention, there is provided a communication processing apparatus that acts as a server for transmitting data to a client. The communication processing apparatus includes a data transceiver configured to carry out communications with the client; a rate controller configured to control and determine a bitrate of data transmitted to the client; and a data processor configured to prepare data to transmit in accordance with the bitrate determined by the rate controller. The rate controller includes a throughput calculator configured to extract an effective data transmission and reception period not including an ineffective data transmission and reception period, the effective and ineffective data transmission and reception periods occurring in a period during which a communication connection is maintained between the server and the client, and to calculate a maximum throughput on the basis of the length of the effective data transmission and reception period and the amount of data transmitted; and a bitrate setter configured to set a transmission bitrate within a range of up to a maximum allowable bitrate corresponding to the maximum throughput calculated by the throughput calculator.

In the communication processing apparatus, the throughput calculator may be configured to define an effective data transmission and reception period corresponding to a period from a start of successive data transmission based on a window size to reception of a reception acknowledgement for the successively transmitted data, and to calculate a maximum throughput on the basis of the length of the effective data transmission and reception period and the amount of data transmitted.

Alternatively, in the communication processing apparatus, the throughput calculator may be configured to define an effective data transmission and reception period corresponding to a period from a start of successive data transmission based on a window size to reception of a reception acknowledgement for the successively transmitted data, to obtain a plurality of pieces of sample data associated with a plurality of effective data transmission and reception periods, and to calculate a maximum throughput on the basis of a plurality of pieces of sample data excluding pieces of data determined as having exceptional values among the plurality of pieces of sample data obtained.

In the communication processing apparatus, The bitrate setter may be configured to set a bitrate on the basis of transition of an estimated buffer amount of a client buffer, and to increase the bitrate within a range of up to an upper limit of the maximum allowable bitrate corresponding to the maximum throughput calculated by the throughput calculator when the estimated buffer amount is greater than or equal to a predetermined threshold.

Furthermore, in the communication processing apparatus, the bitrate setter may be configured to estimate the amount of the client buffer through calculation according to an equation expressed as the estimated buffer amount of the client buffer=$B\_cli+D\_serv-R*T$, using the following information (a) to (d):

(a) a buffer amount $B\_cli$, expressed in bytes, reported from the client at the time of a start of communication;

(b) a time $T$, expressed in seconds, elapsed since a start of playback by the client;

(c) an amount $D\_serv$, expressed in bytes, of data transmitted from the server during the elapsed time $T$ since the start of playback by the client; and (d) a playback rate $R$, expressed in bytes per second, of content that is obtainable from content transmitted.

In the communication processing apparatus, the data transceiver may be configured to receive communication-bandwidth information from an access point that acts as an intermediary for communications with the client, the communication-bandwidth information relating to a communication bandwidth between the access point and the client. In this case, the bitrate setter is configured to set a transmission bitrate on the basis of the communication-bandwidth information.

Furthermore, in the communication processing apparatus, the communication-bandwidth information includes, for example, information that is generated on the basis of data relating to at least one of a round trip time, a received signal strength indicator, and a transmission rate of communications between the access point and the client.

According to another embodiment of the present invention, there is provided a communication processing apparatus that acts as a server for transmitting data to a client. The communication processing apparatus includes a data transceiver configured to carry out communications with the client; a rate controller configured to control and determine a bitrate of data transmitted to the client; and a data processor configured to prepare data to transmit in accordance with the bitrate determined by the rate controller. The rate controller includes a bitrate setter configured to define a maximum throughput calculated on the basis of reception-interval information of data packets that are transmitted successively in a period during which a communication connection is maintained between the server and the client, and to set a transmission bitrate within a range of up to a maximum allowable bitrate corresponding to the maximum throughput.

In the communication processing apparatus, the rate controller may includes a throughput calculator configured to receive from the client reception-interval information of data packets that are transmitted successively in a period during which a communication connection is maintained between the server and the client, and to calculate a maximum throughput on the basis of the reception-interval information and the amount of data transmitted. In this case, the bitrate setter is configured to set a transmission bitrate within a range of up to a maximum allowable bitrate corresponding to the maximum throughput calculated by the throughput calculator.

In the communication processing apparatus, the data transceiver may be configured to successively transmit packets having packet headers with urgent flags set to a specific value, the urgent flags set to the specific value serving as identification information of packets with which the client is supposed to measure a reception interval.

In the communication processing apparatus, the bitrate setter may be configured to set a bitrate on the basis of transition of an estimated buffer amount of a client buffer, and to increase the bitrate within a range of up to an upper limit of the maximum allowable bitrate corresponding to the maximum throughput calculated by the throughput calculator when the estimated buffer amount is greater than or equal to a predetermined threshold.

Furthermore, in the communication processing apparatus, the bitrate setter may be configured to estimate the amount of the client buffer through calculation according to an equation expressed as the estimated buffer amount of the client buffer=$B\_cli+D\_serv-R*T$, using the following information (a) to (d):

(a) a buffer amount $B\_cli$, expressed in bytes, reported from the client at the time of a start of communication;

(b) a time T, expressed in seconds, elapsed since a start of playback by the client;

(c) an amount $D\_serv$, expressed in bytes, of data transmitted from the server during the elapsed time T since the start of playback by the client; and (d) a playback rate R, expressed in bytes per second, of content that is obtainable from content transmitted.

In the communication processing apparatus, the data transceiver may be configured to receive communication-bandwidth information from an access point that acts as an intermediary for communications with the client, the communication-bandwidth information relating to a communication bandwidth between the access point and the client. In this case, the bitrate setter is configured to set a transmission bitrate on the basis of the communication-bandwidth information.

Furthermore, in the communication processing apparatus, the communication-bandwidth information includes, for example, information that is generated on the basis of data relating to at least one of a round trip time, a received signal strength indicator, and a transmission rate of communications between the access point and the client.

According to another embodiment of the present invention, there is provided a communication processing apparatus that acts as a client for receiving data from a server. The communication processing apparatus includes a data transceiver configured to carry out communications with the server; and a packet-interval measurer configured to measure a reception interval of data packets received from the server. The packet-interval measurer is configured to measure a reception interval of packets that are received successively, according to identification information included in packets received from the server, and to transmit reception-interval information representing the reception interval or throughput information calculated on the basis of the reception interval to the server via the data transceiver.

In the communication processing apparatus, the packet-interval measurer may be configured to measure a reception interval of successively received packets according to setting of urgent flags of packet headers included in the packets received from the server.

According to another embodiment of the present invention, there is provided a data communication system including a server and a client that transmit and receive data. The client is configured to measure a reception interval of packets that are received successively, according to identification information included in packets received from the server, and to transmit reception-interval information representing the reception interval or throughput information calculated on the basis of the reception interval to the server. The server is configured to set a transmission bitrate within a range of up to a maximum allowable bitrate corresponding to a maximum throughput that is calculated on the basis of the throughput information or the reception-interval information received from the client, and to transmit data to the client according to the transmission bitrate.

In the communication processing system, the server may be configured to receive communication-bandwidth information from an access point that acts as an intermediary for communications with the client, the communication-bandwidth information relating to a communication bandwidth between the access point and the client, and to determine a transmission bitrate on the basis of the communication-bandwidth information.

According to another embodiment of the present invention, there is provided a communication processing method of a server that transmits data. The communication processing method comprising the steps of controlling and determining a bitrate of data transmitted to a client; and preparing data to transmit in accordance with the bitrate determined in the rate controlling step. The rate controlling step includes the steps of extracting an effective data transmission and reception period not including an ineffective data transmission and reception period, the effective and ineffective data transmission and reception periods occurring in a period during which a communication connection is maintained between the server and the client, and calculating a maximum throughput on the basis of the length of the effective data transmission and reception period and the amount of data transmitted; and setting a transmission bitrate within a range of up to a maximum allowable bitrate corresponding to the maximum throughput calculated in the throughput calculating step.

In the communication processing method, the throughput calculating step may define an effective data transmission and reception period corresponding to a period from a start of successive data transmission based on a window size to reception of a reception acknowledgement for the successively transmitted data, and calculate a maximum throughput on the basis of the length of the effective data transmission and reception period and the amount of data transmitted.

Alternatively, in the communication processing method, the throughput calculating step may define an effective data transmission and reception period corresponding to a period from a start of successive data transmission based on a window size to reception of a reception acknowledgement for the successively transmitted data, obtain a plurality of pieces of sample data associated with a plurality of effective data transmission and reception periods, and calculate a maximum throughput on the basis of a plurality of pieces of sample data excluding pieces of data determined as having exceptional values among the plurality of pieces of sample data obtained.

In the communication processing method, the bitrate setting step may set a bitrate on the basis of transition of an estimated buffer amount of a client buffer, and increase the bitrate within a range of up to an upper limit of the maximum allowable bitrate corresponding to the maximum throughput calculated in the throughput calculating step when the estimated buffer amount is greater than or equal to a predetermined threshold.

Furthermore, in the communication processing method, the bitrate setting step may estimate the amount of the client buffer through calculation according to an equation expressed as the estimated buffer amount of the client buffer=$B\_cli+D\_serv-R*T$, using the following information (a) to (d):

(a) a buffer amount $B\_cli$, expressed in bytes, reported from the client at the time of a start of communication;

(b) a time T, expressed in seconds, elapsed since a start of playback by the client;

(c) an amount D_serv, expressed in bytes, of data transmitted from the server during the elapsed time T since the start of playback by the client; and (d) a playback rate R, expressed in bytes per second, of content that is obtainable from content transmitted.

In the communication processing method, the communication processing method may further include the step of receiving communication-bandwidth information from an access point that acts as an intermediary for communications with the client, the communication-bandwidth information relating to a communication bandwidth between the access point and the client. In this case, the bitrate setting step sets a transmission bitrate on the basis of the communication-bandwidth information.

Furthermore, in the communication processing method, the communication-bandwidth information may include information that is generated on the basis of data relating to at least one of a round trip time, a received signal strength indicator, and a transmission rate of communications between the access point and the client.

According to another embodiment of the present invention, there is provided a communication processing method of a server that transmits data. The communication processing method comprising the steps of controlling and determining a bitrate of data transmitted to a client; and preparing data to transmit in accordance with the bitrate determined in the rate controlling step. The rate controlling step includes the steps of defining a maximum throughput calculated on the basis of reception-interval information of data packets that are transmitted successively in a period during which a communication connection is maintained between the server and the client, and setting a transmission bitrate within a range of up to a maximum allowable bitrate corresponding to the maximum throughput.

In the communication processing method, the rate controlling step may include the step of receiving from the client reception-interval information of data packets that are transmitted successively in a period during which a communication connection is maintained between the server and the client, and calculating a maximum throughput on the basis of the reception-interval information and the amount of data transmitted. In this case, the bitrate setting step sets a transmission bitrate within a range of up to a maximum allowable bitrate corresponding to the maximum throughput calculated in the throughput calculating step.

The communication processing method may further include the step of successively transmitting packets having packet headers with urgent flags set to a specific value, the urgent flags set to the specific value serving as identification information of packets with which the client is supposed to measure a reception interval.

In the communication processing method, the bitrate setting step may set a bitrate on the basis of transition of an estimated buffer amount of a client buffer, and increase the bitrate within a range of up to an upper limit of the maximum allowable bitrate corresponding to the maximum throughput calculated in the throughput calculating step when the estimated buffer amount is greater than or equal to a predetermined threshold.

Furthermore, in the communication processing method, the bitrate setting step may estimate the amount of the client buffer through calculation according to an equation expressed as the estimated buffer amount of the client buffer=B_cli+D_serv−R*T, using the following information (a) to (d):

(a) a buffer amount B_cli, expressed in bytes, reported from the client at the time of a start of communication;

(b) a time T, expressed in seconds, elapsed since a start of playback by the client;

(c) an amount D_serv, expressed in bytes, of data transmitted from the server during the elapsed time T since the start of playback by the client; and (d) a playback rate R, expressed in bytes per second, of content that is obtainable from content transmitted.

The communication processing method may further include the step of receiving communication-bandwidth information from an access point that acts as an intermediary for communications with the client, the communication-bandwidth information relating to a communication bandwidth between the access point and the client. In this case, the bitrate setting step sets a transmission bitrate on the basis of the communication-bandwidth information.

In the communication processing method, the communication-bandwidth information may include information that is generated on the basis of data relating to at least one of a round trip time, a received signal strength indicator, and a transmission rate of communications between the access point and the client.

According to another embodiment of the present invention, there is provided a communication processing method of a client that receives data. The communication processing method comprising the steps of measuring a reception interval of packets that are received successively, according to identification information included in packets received from a server; and transmitting packet-reception-interval information representing the packet reception interval measured in the packet-reception-interval measuring step or throughput information calculated on the basis of the reception interval to the server.

In the communication processing method, the packet-reception-interval measuring step may measure a reception interval of successively received packets according to setting of urgent flags of packet headers included in the packets received from the server.

Further objects, features, and advantages of the present invention will become apparent from the following detailed description of embodiments with reference to the accompanying drawings. In this specification, a system refers to a logical combination of a plurality of apparatuses, irrespective of whether the individual constituent apparatuses are provided within the same case.

According to certain embodiments of the present invention, a maximum throughput is calculated on the basis of a measured value associated with a period of successive transmission of data and reception of a reception acknowledgement, i.e., a measured value associated with an "effective data transmission and reception period", and a transmission bitrate is controlled on the basis of the maximum throughput. That is, a maximum throughput is calculated on the basis of a data transmission and reception period not including an "ineffective data transmission and reception period" that does not actually contribute to data transmission and reception, and a bitrate is controlled within a range of up to an upper limit of a maximum allowable bitrate corresponding to the maximum throughput. This allows controlling the bitrate in consideration of an actual transmission rate. Accordingly, data can be transmitted within a range of up to an upper limit of a maximum allowable bitrate at which data can be transmitted reliably without excessively increasing or decreasing the bitrate.

Furthermore, according to certain embodiments of the present invention, a maximum throughput is calculated on the basis of a reception interval of successively transmitted packets, measured at a client, and a bitrate is controlled within a range of up to an upper limit of a maximum allowable bitrate corresponding to the maximum throughput. That is, a maximum throughput is calculated on the basis of an actually measured reception interval of successively transmitted packets, and a bitrate is controlled within a range of up to an upper limit of a maximum allowable bitrate corresponding to the maximum throughput. This allows controlling the bitrate in consideration of an actual transmission bitrate. Accordingly, data can be transmitted within a range of up to an upper limit of a maximum allowable bitrate at which data can be transmitted reliably without excessively increasing or decreasing the bitrate.

Furthermore, according to certain embodiments of the present invention, in addition to controlling a bitrate on the basis of a maximum throughput calculated on the basis of actual measurement of data transmitted and received, the bitrate is also controlled on the basis of communication-bandwidth information relating to a communication bandwidth measured by an access point (AP), the communication-bandwidth information relating to a communication bandwidth of wireless communications between the access point and a client, such as a round trip time, a received signal strength indicator, or a transmission rate. This allows controlling the bitrate so as to adapt immediately to variation in the status of wireless communications.

BRIEF DESCRIPTION OF THE DRAWINGS

FIG. 16 is a diagram showing an example of hardware configuration of a server, a client, and an access point.

DESCRIPTION OF THE PREFERRED EMBODIMENTS

Now, communication processing apparatuses, data communication systems, and communication processing methods according to embodiments of the present invention will be described with reference to the drawings.

System Overview

Figure 1:
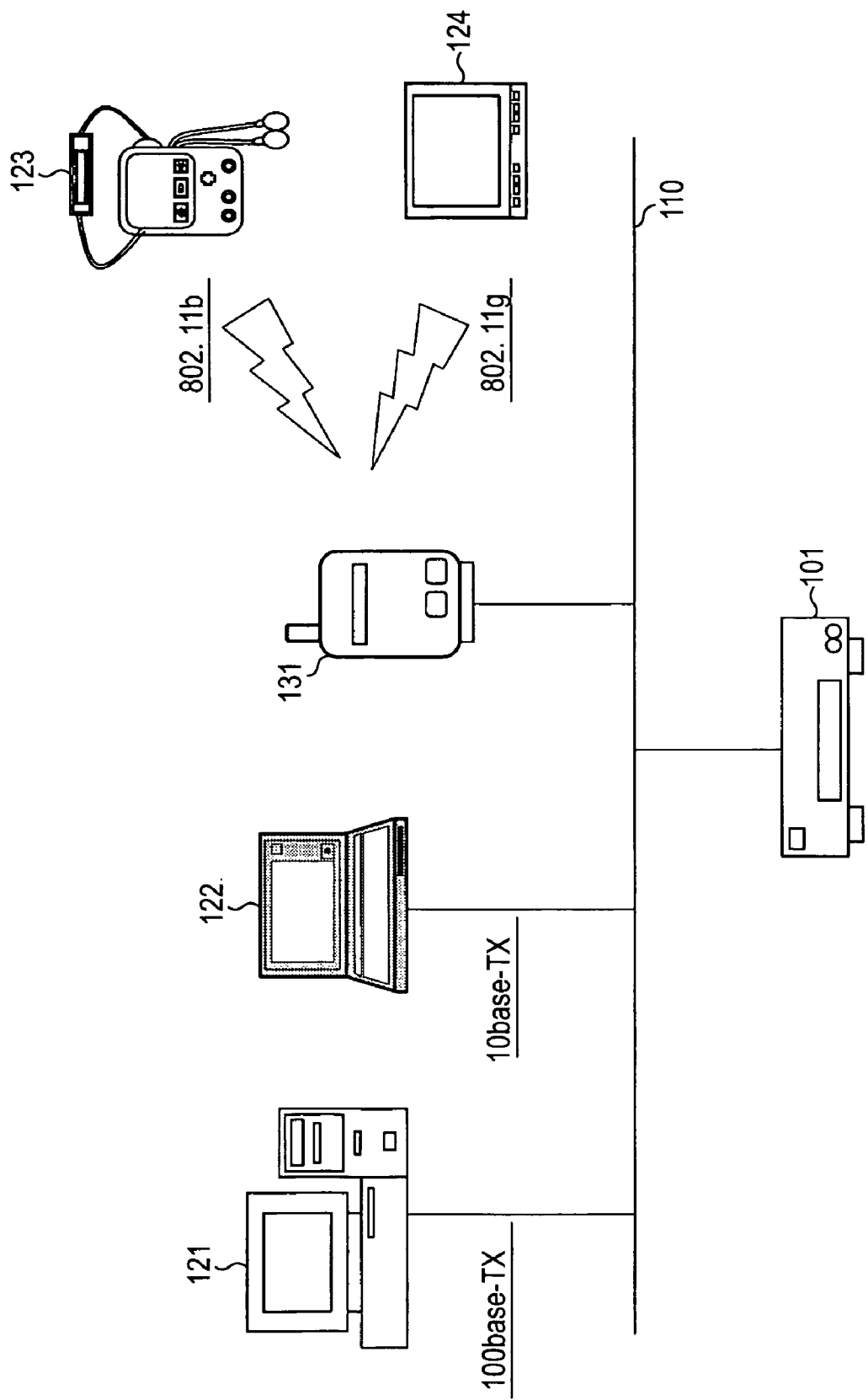
FIG. 1 is a diagram showing an example of network configuration for embodiments of the present invention.

First, an example of network configuration for embodiments of the present invention will be described with reference to FIG. 1. The network configuration shown in FIG. 1 is, for example, a home network configuration, in which a server 101 is connected to clients 121 to 124 via a network 110. The server 101 acts as a content distributing apparatus that executes processing in response to processing requests transmitted from various client apparatuses. As examples of client apparatuses, FIG. 1 shows personal computers (PC) 121 and 122, a portable terminal 123, and a playback apparatus 124. However, various other types of electronic apparatuses and household electrical appliances can be connected as client apparatuses.

The client (portable terminal) 123 and the client (playback apparatus) 124 carry out wireless communications via an access point (AP) 131. The clients (PCs) 121 and 122 carry out communications with the server 101 via a wired LAN. For example, the client (PC) 121 carries out communications according to the 100base-TX standard and the client (PC) 122 carries out communications according to the 100base-T standard with the server 101. The client (portable terminal) 123 and the client (playback apparatus) 124 carry out communications with the server 101 via the access point (AP) 131. The access point (AP) 131 and the client (portable terminal) 123 carry out wireless LAN communications with each other according to the IEEE 802.11b standard. The access point (AP) 131 and the client (playback apparatus) 124 carry out communications with each other according to the IEEE 802.11g standard.

As described above, when carrying out communications with the server 101, for example, when receiving distribution of video data from the server 101, the clients 121 to 124 carry out data communications according to communication standards respectively supported by the clients 121 to 124, and receive data at respectively different bitrates. Processing executed by the server 101 in response to requests from clients includes, for example, a content distribution service of providing content stored in a storage device such as a hard disc or a DVD mounted on the server 101 or live content received via a tuner of the server 101.

The network 110 transmits and receives communication packets such as Ethernet® frames via a network 100. More specifically, a client transmits an Ethernet frame including processing-request information in a data portion thereof to the server 101 to issue a data processing request to the server 101. In response to the processing-request frame received, the server 101 executes data processing and stores the result in communication packets, and transmits the communication packets to clients.

The server 101 establishes TCP (Transmission Control Protocol) connections individually with the clients 121 to 124, and transmits, for example, multimedia data including video data by streaming data distribution. In this embodiment, distribution of data from the server 101 to the clients 121 to 124 via the TCP connections involves dynamic bitrate control.

The dynamic bitrate control includes the steps of calculating maximum throughputs of data communications between the server and the individual clients, and controlling the bitrates to set bitrates corresponding to the maximum throughputs calculated as maximum allowable bitrates. Now, embodiments of the dynamic bitrate control will be described in detail.

First Embodiment

Figure 2:
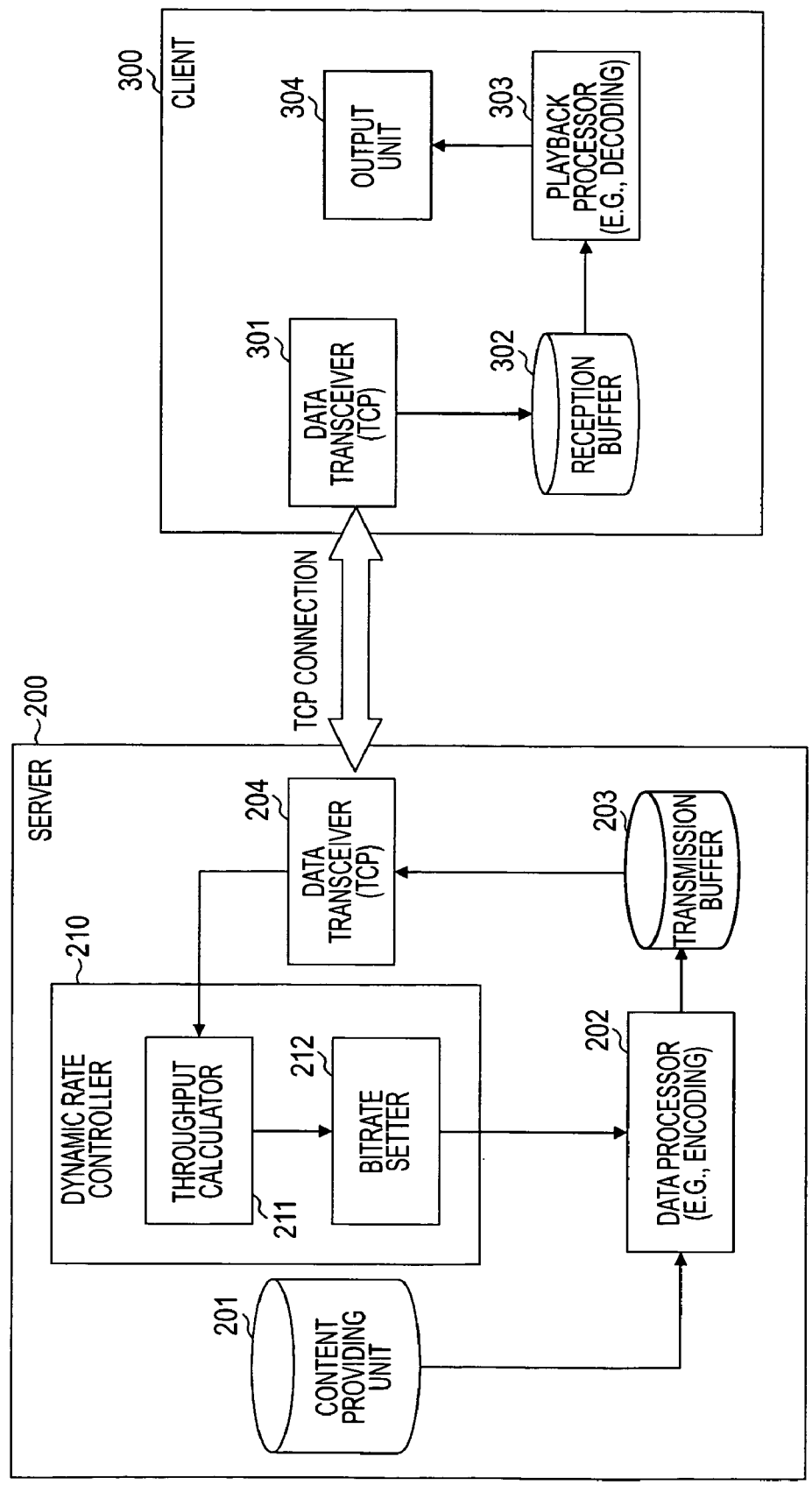
FIG. 2 is a block diagram of a server and a client that act as a transmitting apparatus and a receiving apparatus of streaming data.

FIG. 2 is a block diagram for explaining functions of a server 200 that distributes streaming data and a client 300 that receives and plays back streaming data. The server 200 and the client 300 establish a TCP connection and carry out communications with each other.

The server 200 includes a content providing unit 201 in which content to transmit is stored. The content providing unit 201 includes a storage device such as a hard disc or a DVD, or has a tuner function for receiving content from the outside. Content that is to be transmitted to the client 300 is input from the content providing unit 201 to a data processor 202.

The data processor 202 executes processing for generating data to transmit, such as encoding. In the processing for generating data to transmit, encoded data is generated in accordance with a bitrate determined by a dynamic rate controller 210. Alternatively, pieces of data based on a plurality of bitrates may be prepared in advance, so that data to transmit can be selected from the pieces of data based on the plurality of bitrates.

The dynamic rate controller 210 includes a throughput calculator 211 and a bitrate setter 212. The throughput calculator 211 monitors the status of communications carried out between a data transceiver 204 of the server and a data transceiver 301 of the client, and calculates a throughput on the basis of the results of the monitoring. The bitrate setter 212 determines a transmission bitrate for data transmission to the client 300 on the basis of the throughput calculated by the throughput calculator 211, and reports the bitrate to the data processor 202. Processing executed by the dynamic rate controller 210 will be described later in detail.

The data processor 202 encodes data to transmit in accordance with the bitrate set by the bitrate setter 212 or select encoded data in accordance with the bitrate set by the bitrate setter 212, and inputs the encoded data to a transmission buffer 203. The data transceiver 204 transmits data (packets) accumulated in the transmission buffer 203 to the client 300 via the TCP connection established with the client 300.

The client 300 receives streaming data (packets) from the server 200 via the data transceiver 301 and stores the data in a reception buffer 302. The data stored in the reception buffer 302 is sequentially retrieved and decoded by a playback processor 303, for example, expanded if the data has been compressed or decrypted if the data has been encrypted, and the decoded data is output to an output unit 304, such as a display, a speaker, or the like.

Figure 3:
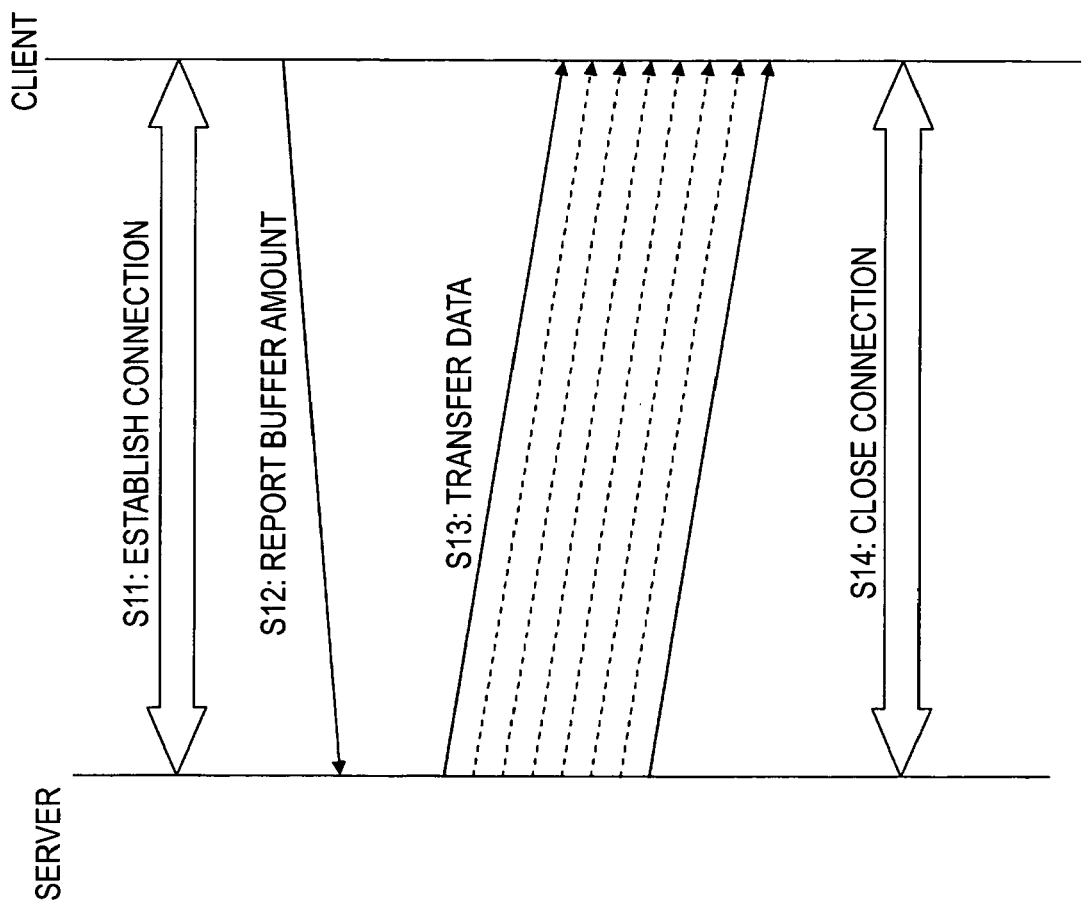
FIG. 3 is a diagram showing a sequence of a process of distributing data via a TCP connection established between a server and a client.

FIG. 3 is a diagram showing a sequence of a communication process executed between a server and a client. First, in step S11, a TCP connection is established between the server and the client. Then, in step S12, the client reports a buffer amount to the server. The report of the buffer amount may be included in the process of establishing a TCP connection.

In this embodiment, a maximum amount of an application buffer of a client that receives streaming data, i.e., a maximum amount of an application buffer provided for receiving streaming data, is reported to the server at the start of streaming. In FIG. 2, the reception buffer 302 is an application buffer of a client that receives streaming data, and a maximum amount of the reception buffer 302 is reported to the server. For example, when streaming data conforms to HTTP, the client reports the application buffer amount in an HTTP header. The server uses the buffer amount reported from the client as an index for increasing or decreasing the bitrate under the control of the dynamic rate controller 210. This process will be described later. The client reports a buffer amount to the server only once at the start of streaming.

Then, in step S13, the server distributes streaming data to the client. In this process of transmitting streaming data, the dynamic rate controller 210 of the server 200 shown in FIG. 2 dynamically controls the transmission bitrate so that the streaming data will be transmitted at an optimal bitrate. The process will be described later more specifically. When the transmission of all the streaming data is finished, in step S14, the connection between the server and the client is closed, and the process is then exited.

Next, the process of controlling the bitrate of transmission data, executed by the dynamic rate controller 210 of the server 200 shown in FIG. 2, will be described in detail with reference to FIGS. 4 to 6. First, a throughput calculating process executed by the throughput calculator 211 of the dynamic rate controller 210 will be described with reference to FIG. 4.

Figure 4:
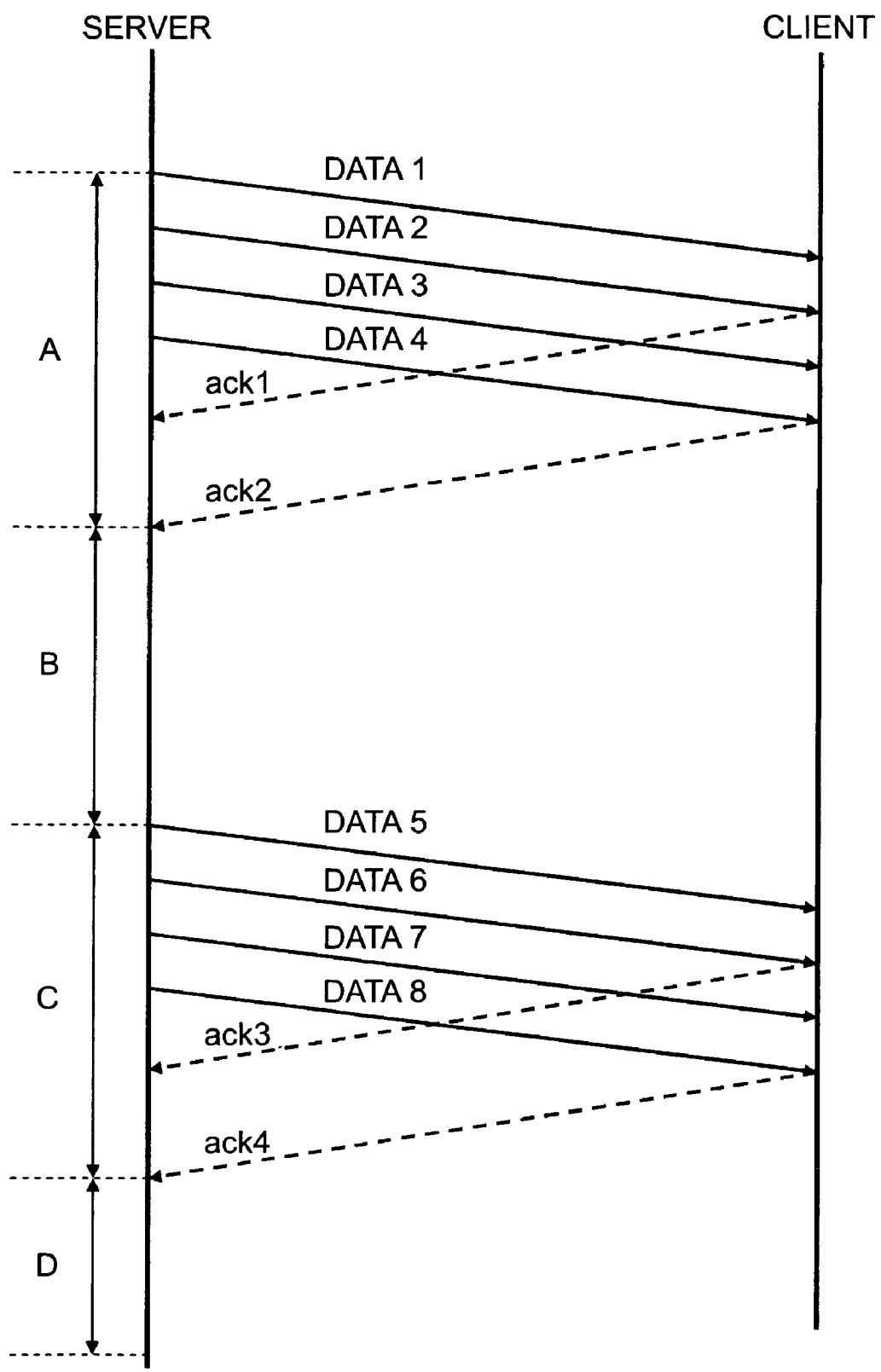
FIG. 4 is a diagram showing a process of successively distributing data on the basis of a window size.

FIG. 4 is a sequence diagram more specifically showing the data transferring process in step S13 shown in FIG. 3. The server stores streaming distribution data in TCP packets (TCP segments) and transmits the TCP packets to the client. In FIG. 4, data 1 to 8 represent individual packets transmitted. In TCP communications, the client transmits reception acknowledgements (ack) to the server. In FIG. 4, ack1 to ack4 represent reception acknowledgements transmitted from the client to the server. The reception acknowledgements (ack) transmitted from the client to the server are not necessarily transmitted from the client individually in association with all transmission data. The client may refrain from transmission of reception acknowledgements (ack) when time does not permit. In FIG. 4, ack1 is a reception acknowledgement (ack) for data 1 and data 2, and ack2 is a reception acknowledgement for data 3 and data 4.

Data is transmitted successively from the server to the client on the basis of a window size presented from the client to the server. In the example shown in FIG. 4, the data 1 to the data 4 are transmitted successively. More specifically, when a server transmits a packet, receives a reception acknowledgement for the packet from the client, and then transmits a next packet, the throughput decreases, so that the efficiency of data transmission is reduced.

In order to avoid this situation, a window size representing a certain data amount that can be transmitted at once is determined, and packets are successively transmitted on the basis of the window size. The window size is reported from the client to the server, for example, when a session is established. That is, a window size representing an amount of data that can be received at once by the client is reported to the server. The server successively transmits packets having a data amount corresponding to the window size. Furthermore, the client reports an updated window size in a reception acknowledgement (ack) transmitted from the client to the server, and the server changes an amount of successive transmission of data on the basis of the updated window size.

When data is transmitted on the basis of the window size, data transmission from the server to the client takes place intermittently, as shown in FIG. 4. For example, a period A shown in FIG. 4 is a period of successive transmission of data to reception of the last acknowledgement (ack) for the successively transmitted data.

In FIG. 4, a period B is a wait period from the end of the period A, i.e., the reception time of the last reception acknowledgement (ack) for the set of TCP data transmitted in the period A, to the start of transmission of a next set of TCP data. A period C is a period of transmission of a next TCP data set after the period B and reception of reception acknowledgements (ack).

In the throughput calculating method that has hitherto been used, it has been the case to calculate a throughput simply by dividing the amount of transmission data by a transmission time. For example, regarding the data transmission sequence shown in FIG. 3, it has been the case to calculate a throughput in the periods A to C by:

Throughput=(Amount of transmission data 1 to 8)/(Periods A+B+C). This method of throughput calculation does not yield a value greater than a value corresponding to the amount of data transmitted from the server.

However, in TCP data transmission, when the transmission bitrate is controlled so that data can be transmitted at a higher bitrate, a maximum allowable bitrate, i.e., to what extent the bitrate can be increased, is to be determined.

In this embodiment, a maximum throughput is predicted by dividing the amount of transferred data by a time not including the period B in FIG. 4, and a maximum allowable bitrate is determined correspondingly to the maximum throughput. The period B in FIG. 4 is a period in which the server is not transmitting data to the client. When the period B is included in the measurement of a period for calculating a throughput, a period in which data is not actually being transmitted or received is involved in the measurement of a throughput, so that a period that does not contribute to the actual throughput is used for the calculation of a throughput. That is, when a maximum throughput is calculated with the period B included, in which data is not transmitted or received, the maximum throughput decreases. That is, measurement of the TCP throughput in this case does not yield a value greater than or equal to a bitrate of content.

According to this embodiment, calculation of a throughput is based on a period not including an ineffective data transmission and reception period such as the period B. That is, calculation of a throughput is based on periods of successive data transmission on the basis of the window size and reception acknowledgements (ack) therefor, such as the periods A and C shown in FIG. 4. More specifically, a plurality of samples for throughput calculation is calculated, for example, as follows:

Sample 1 for throughput calculation=(Amount of transmitted data 1 to 4)/(Periods $A+B-B$)

Sample 2 for throughput calculation=(Amount of transmitted data 5 to 8)/(Periods $C+D-D$)

.

.

.

Sample $n$ for throughput calculation

Then, a maximum throughput is calculated on the basis of these samples for throughput calculation. In the above equation, D is a period that occurs after the period C shown in FIG. 4, in which data is not transmitted.

As described above, according to this embodiment, only "effective data transmission and reception periods", i.e., periods in which successive data is transmitted and reception acknowledgements (ack) are received, such as the periods A and C shown in FIG. 4, are used for the process of calculating a throughput, and an "ineffective data transmission and reception period", such as the period B shown in FIG. 4, is not used for the process of calculating a throughput. According to this process, only effective periods in which data transmission and acknowledgement reception (ack) actually take place in a TCP session are used for calculating a throughput, so that a true TCP maximum throughput can be measured.

As described above, during transmission of data packets in a TCP session, data is successively transmitted on the basis of a window size. That is, when the window is not full on the client side, data packets are successively transmitted without waiting for reception acknowledgements (ack). Thus, "effective data transmission and reception periods" of transmitting successive data and receiving reception acknowledgements (ack), such as the period A or C shown in FIG. 4, and "ineffective data transmission periods", such as the period B, occur alternately.

TCP packet data that is transmitted in an "effective data transmission and reception period" of transmitting successive data and receiving reception acknowledgement, such as the period A or C shown in FIG. 4, will be referred to as a "TCP data set". Effective data transmission and reception periods associated with individual TCP data sets are considerably affected by the window size or instantaneous congestion. Thus, values tend to vary considerably so that the results of measurement of a maximum throughput are not stable. In this embodiment, in order to avoid this situation, as described earlier, a plurality of samples for throughput calculation is calculated, as follows:

Sample 1 for throughput calculation=(Amount of transmitted data 1 to 4)/(Periods $A+B-B$)

Sample 2 for throughput calculation=(Amount of transmitted data 5 to 8)/(Periods $C+D-D$)

.

.

.

Sample $n$ for throughput calculation

A throughput is calculated on the basis of these samples for throughput calculation. Among the data of the samples for throughput calculation, measurement results that differ extremely from the other sample data are excluded as exceptional values.

The procedure of a maximum-throughput calculating process executed by the throughput calculator 211 of the dynamic rate controller 210 of the server shown in FIG. 2 in this embodiment will be described with reference to a flowchart shown in FIG. 5. The throughput calculator 211 considers a period from the start of successive data transmission based on a window size to reception of a reception acknowledgement (ack) for the successively transmitted data as an effective data transmission and reception period, and calculates a maximum throughput on the basis of the length of the effective data transmission and reception period and the amount of data transmitted. FIG. 5 is a flowchart showing the procedure of a process in which the server 200 establishes a connection with the client, carries out communications, and closes the TCP connection.

First, in step S101, the server establishes a TCP connection with a client to which streaming data is to be distributed. At the time of the establishment of the connection, the server receives a report of a buffer amount (corresponding to a window size) from the client.

When it is determined in step S102 that a data transmission request has been received from an upper-layer application, in step S103, the server starts transmission of TCP segments (packets), and stores a transmission start time Ts in a memory. The transmission of packets is executed by successively transmitting packets having a data amount corresponding to the window size reported earlier from the client, such as the transmission of a plurality of pieces of data in the period A shown in FIG. 4.

In step S104, the server checks whether a reception acknowledgement (TCP ACK) from the client has been received. When a reception acknowledgement (TCP ACK) has not been received, in step S105, the server checks whether the TCP transmission window has a maximum value (MAX), i.e., whether packets having a data amount corresponding to the window size have been transmitted. When packets having a data amount corresponding to the window size have not been transmitted, in step S106, the server continues transmission of TCP packets (segments).

When the TCP transmission window has a maximum value (MAX), i.e., when packets having a data amount corresponding to the window size have been transmitted, the server waits for a reception acknowledgement. When it is determined in step S104 that a reception acknowledgement has been received, in step S107, the server checks whether a reception acknowledgement (TCP ACK) associated with the last segment of the transmitted TCP segments has been received, and if not, waits until the reception acknowledgement is received. The reception acknowledgement (TCP ACK) associated with the last segment is, for example, ack2 in the period A shown in FIG. 4.

When it is determined in step S107 that the reception acknowledgement (TCP ACK) associated with the last segment has been received, in step S108, the server stores a reception time Te of the reception acknowledgement (TCP ACK) associated with the last segment.

Then, in step S109, the server calculates a sample duration period for throughput calculation Tn=Te−Ts. This calculation is executed by the throughput calculator 211 of the dynamic rate controller 210 of the server 200 shown in FIG. 2. Tn=Te−Ts represents a measured value of an effective data transmission and reception period, i.e., the period of transmission of successive data and reception of a reception acknowledgement (ack), such as the period A or C shown in FIG. 4.

Then, in step S110, the server checks whether the number of samples n that have been measured has become greater than or equal to a predetermined threshold Thn. When the number n of samples that have been measured is not greater than or equal to the predetermined threshold Thn, in step S111, the server checks whether communication is being continued. When communication is being continued, the process returns to step S102, and subsequent steps are repeated until the number n of measured samples becomes greater than or equal to the predetermined threshold Thn, thereby collecting samples associated with sample duration periods Tn=Te−Ts for throughput calculation. That is, a predetermined number of measured values associated with effective data transmission and reception periods, such as the periods A and C of transmission of successive data and reception of reception acknowledgements (ack) shown in FIG. 4, is collected until the number n of measured samples becomes greater than or equal to the predetermined threshold Thn.

When it is determined in step S110 that the number of measured samples n has become greater than or equal to the predetermined threshold Thn, in step S112, among the measured samples associated with the sample duration periods T1 to Tn for throughput calculation, samples having extreme values are excluded as exceptional values. Then, in step S113, a maximum throughput is calculated using only data associated with sample duration periods T1 to Tn for throughput calculation with exceptional values excluded.

In step S113, a maximum throughput is calculated according to:

Maximum throughput=(Σ(Amounts of data transmitted in individual effective data transmission and reception periods))/(Σ(Individual effective data transmission and reception periods))

In the above equation, Σ(Amounts of data transmitted in individual effective data transmission and reception periods) and Σ(Individual effective data transmission and reception periods) do not include periods and amounts of transmitted data associated with exceptional values.

In this manner, the throughput calculator 211 of the dynamic rate controller 210 of the server 200 shown in FIG. 2 calculates a maximum throughput on the basis of measured lengths and transmission data amounts of a plurality of effective data transmission and reception periods. The throughput calculated in this process does not involve the ineffective data transmission and reception period B shown in FIG. 4. The throughput calculator 211 inputs the throughput calculated as a maximum throughput to the bitrate setter 212 of the dynamic rate controller 210 of the server 200 shown in FIG. 2.

Figure 6:
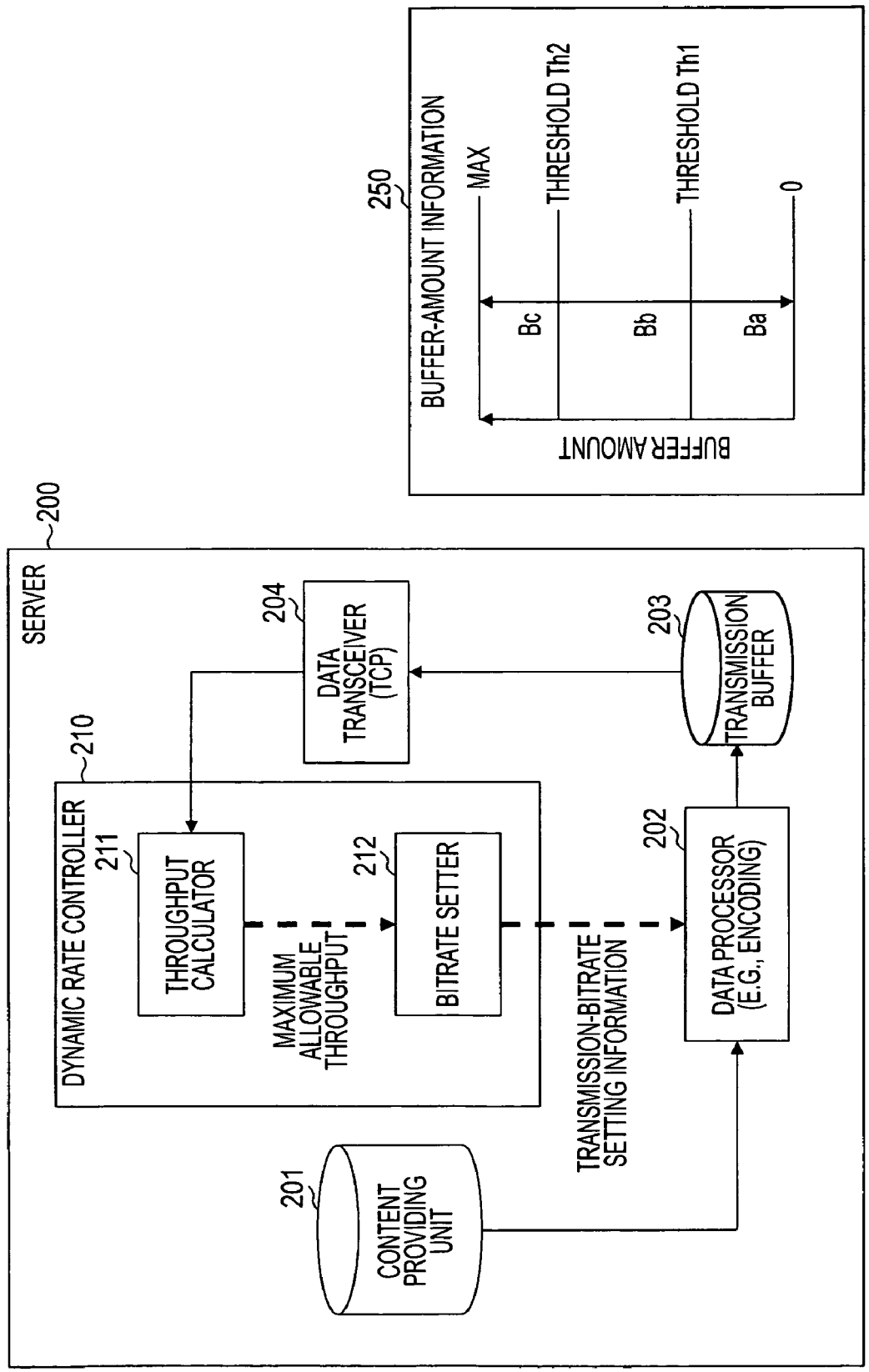
FIG. 6 is a diagram for explaining processing executed by a bitrate setter in the first embodiment of the present invention.
Figure 7:
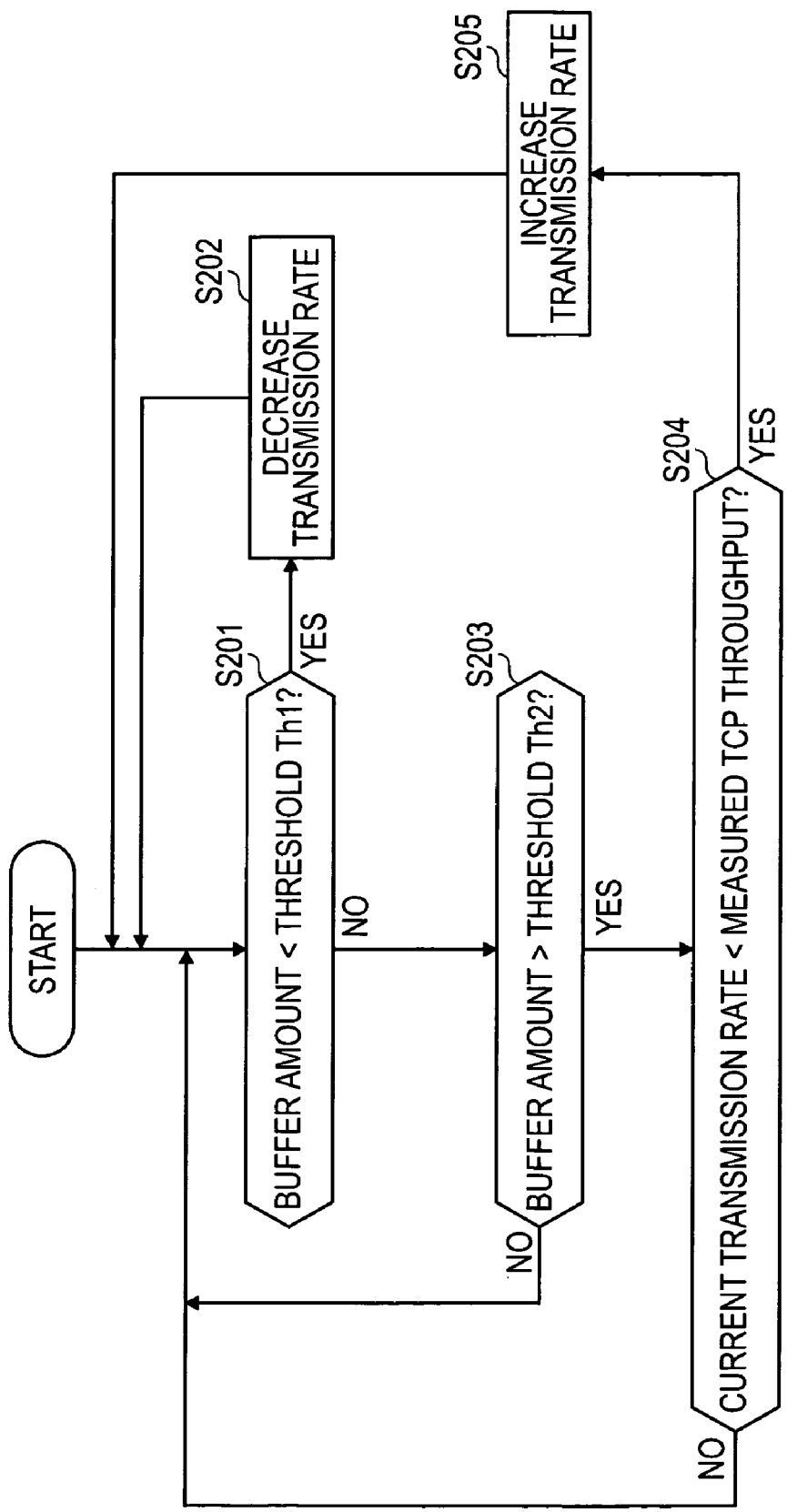
FIG. 7 is a flowchart of a sequence of a process executed by the bitrate setter in the first embodiment of the present invention.

Now, a process executed by the bitrate setter 212 will be described with reference to FIGS. 6 and 7. Referring to FIG. 6, the bitrate setter 212 receives input of the maximum throughput calculated by the throughput calculator 211 as described above, estimates the buffer amount of a client to determine a bitrate, and inputs transmission-data bitrate setting information to the data processor 202 that executes encoding or selection of encoded data.

The bitrate setter 212 estimates the buffer amount of a client using the following information:

Buffer amount B_cli (bytes) reported from the client at the start of communication Time T (seconds) elapsed since the start of playback by the client Amount D_serv (bytes) of data transmitted from the server during the elapsed time T since the start of playback by the client Playback rate R (bytes/seconds) of content that can be obtained from content transmitted The server can recognize the start of playback of transmitted content at the client when the amount of data actually transmitted by the server exceeds the buffer amount B_cli reported from the client. That is, the client accumulates data in the buffer corresponding to the buffer amount B_cli of the client before the start of content playback, and when the server has transmitted data corresponding to the amount, the server considers that the client buffer has become full and playback has started.

At the time of the start of content playback at the client, the buffer amount of the client is B_cli. When a time T elapses after the start of playback, the server transmits data having an amount D_serv (bytes) to the client, and the data transmitted is accumulated in the client buffer. The client plays back data having an amount R*T (bytes), and then the data having that data amount is deleted from the client buffer.

On the basis of such transition of data, the server estimates the current buffer amount of client as B+D−R*T. The buffer amount estimated as described above is represented in a range of 0 to MAX as indicated by buffer-amount information 250 shown in FIG. 6. MAX corresponds to the client buffer amount B_cli. The bitrate setter 212 determines a bitrate on the basis of such transition of the estimated buffer amount of the client buffer. When the estimated buffer amount is greater than or equal to a predetermined threshold, the bitrate is increased within a range of up to an upper limit of a maximum allowable bitrate corresponding to the maximum throughput calculated by the throughput calculator 211.

Now, the sequence of a process executed by the bitrate setter 212 will be described with reference to a flowchart shown in FIG. 7. In step S201, the bitrate setter 212 checks whether the buffer amount is less than a predetermined threshold Th1. The buffer amount herein refers to a buffer amount estimated in the manner described above. When it is determined that the buffer amount is less than the predetermined threshold Th1, in step S202, the bitrate setter 212 decreases the transmission bitrate. This occurs when the buffer amount is in a range Ba of the buffer-amount information 250 shown in FIG. 6.

When it is determined in step S201 that the buffer amount is not less than the predetermined threshold Th1, in step S23, the bitrate setter 212 checks whether the buffer amount is greater than a predetermined threshold Th2. When the buffer amount is not greater than the predetermined threshold Th2, the process returns to step S201. This occurs when the buffer amount is in a range Bb of the buffer-amount information 250 shown in FIG. 6.

When the buffer amount is greater than the predetermined threshold Th2, in step S204, the bitrate setter 212 compares the current transmission-data bitrate with the maximum throughput calculated by the throughput calculator 211 in the process described above. When the current transmission-data bitrate is less than the bitrate corresponding to the maximum throughput calculated by the throughput calculator 211, in step S205, the bitrate setter 212 increases the transmission bitrate. However, the bitrate corresponding to the maximum throughput calculated by the throughput calculator 211, i.e., a maximum allowable bitrate, serves as an upper limit. When the current transmission-data bitrate is equal to the maximum allowable bitrate corresponding to the maximum throughput calculated by the throughput calculator 211, the process returns to step S201 without changing the bitrate. This occurs when the buffer amount is in a range Bc of the buffer-amount information 250 shown in FIG. 6.

Figure 5:
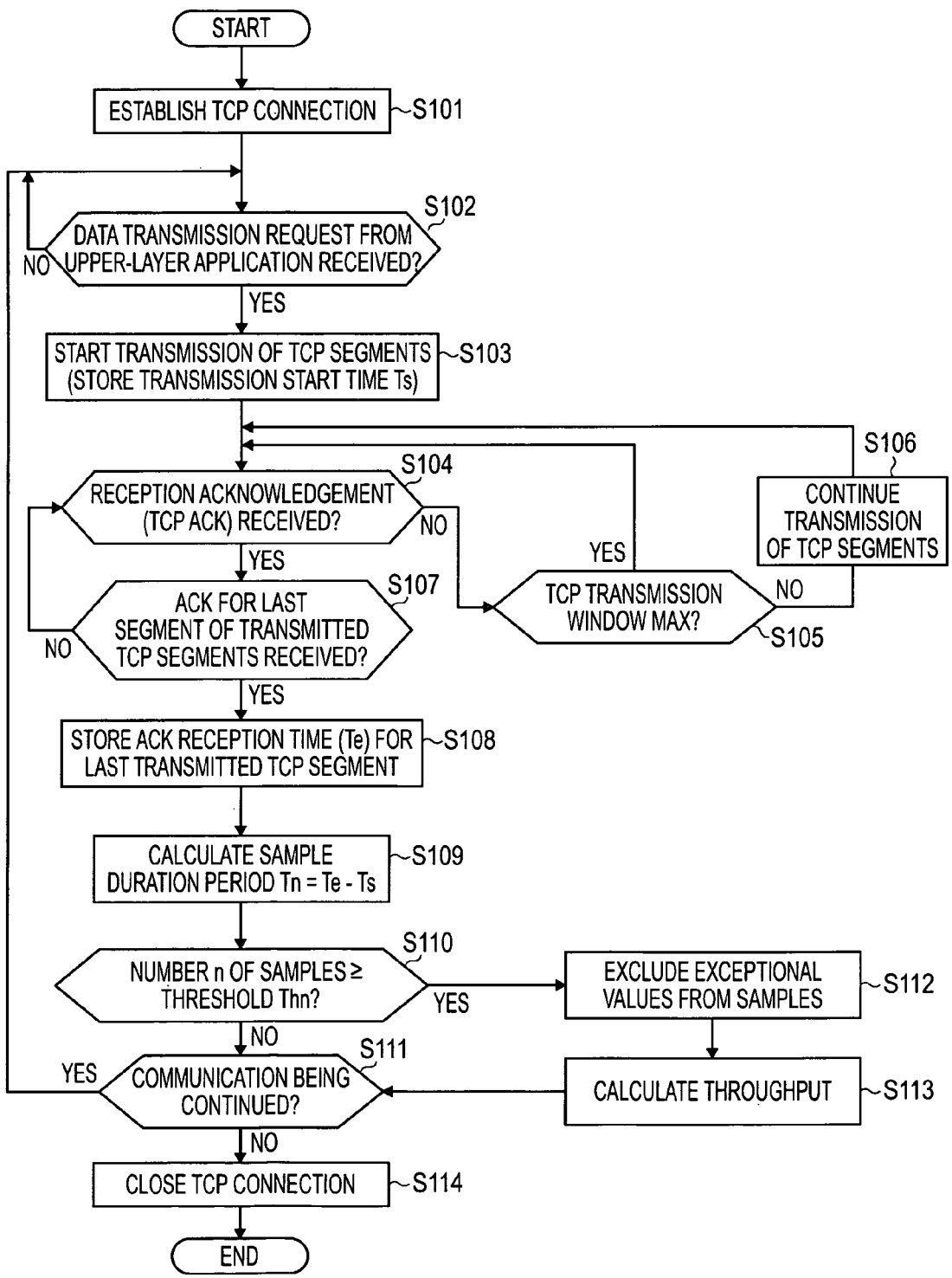
FIG. 5 is a flowchart of a sequence of a process executed by a server in a first embodiment of the present invention.

The throughput calculating process described earlier with reference to the flowchart shown in FIG. 5 is repeated by a predetermined period while data communications are being continued, and the throughput calculator 211 consecutively updates the throughput and inputs the updated throughput to the bitrate setter 212. The bitrate setter 212 repeats the process in the flowchart shown in FIG. 7 to consecutively determine a bitrate on the basis of the maximum allowable bitrate corresponding to the latest maximum throughput calculated by the throughput calculator 211. Thus, the bitrate is controlled on the basis of a maximum throughput in accordance with network status.

In this embodiment, as described with reference to FIG. 4, a maximum throughput is calculated using measured values associated with "effective data transmission and reception periods", i.e., the periods of transmission of successive data and of reception acknowledgements, such as the periods A and C shown in FIG. 4, and the transmission bitrate is controlled within a range of up to an upper limit of a maximum allowable bitrate corresponding to the maximum throughput. That is, a maximum throughput is calculated on the basis of an effective data transmission and reception period not including an ineffective data transmission and reception period that does not contribute to data transmission and reception, such as the period B shown in FIG. 4, and the bitrate is controlled within a range of up to an upper limit of a maximum allowable bitrate corresponding to the maximum throughput calculated. According to this embodiment, it is possible to control the bitrate in consideration of an actual transmission rate. Thus, data can be transmitted within a range of up to an upper limit corresponding to a maximum bitrate at which data can be transmitted reliably, without excessively increasing or decreasing the bitrate.

Second Embodiment

Next, a second embodiment of the present invention will be described. In the second embodiment, a throughput or a value used to calculate a throughput is calculated by a client on the basis of received data, and a server controls the bitrate on the basis of the value calculated.

Figure 8:
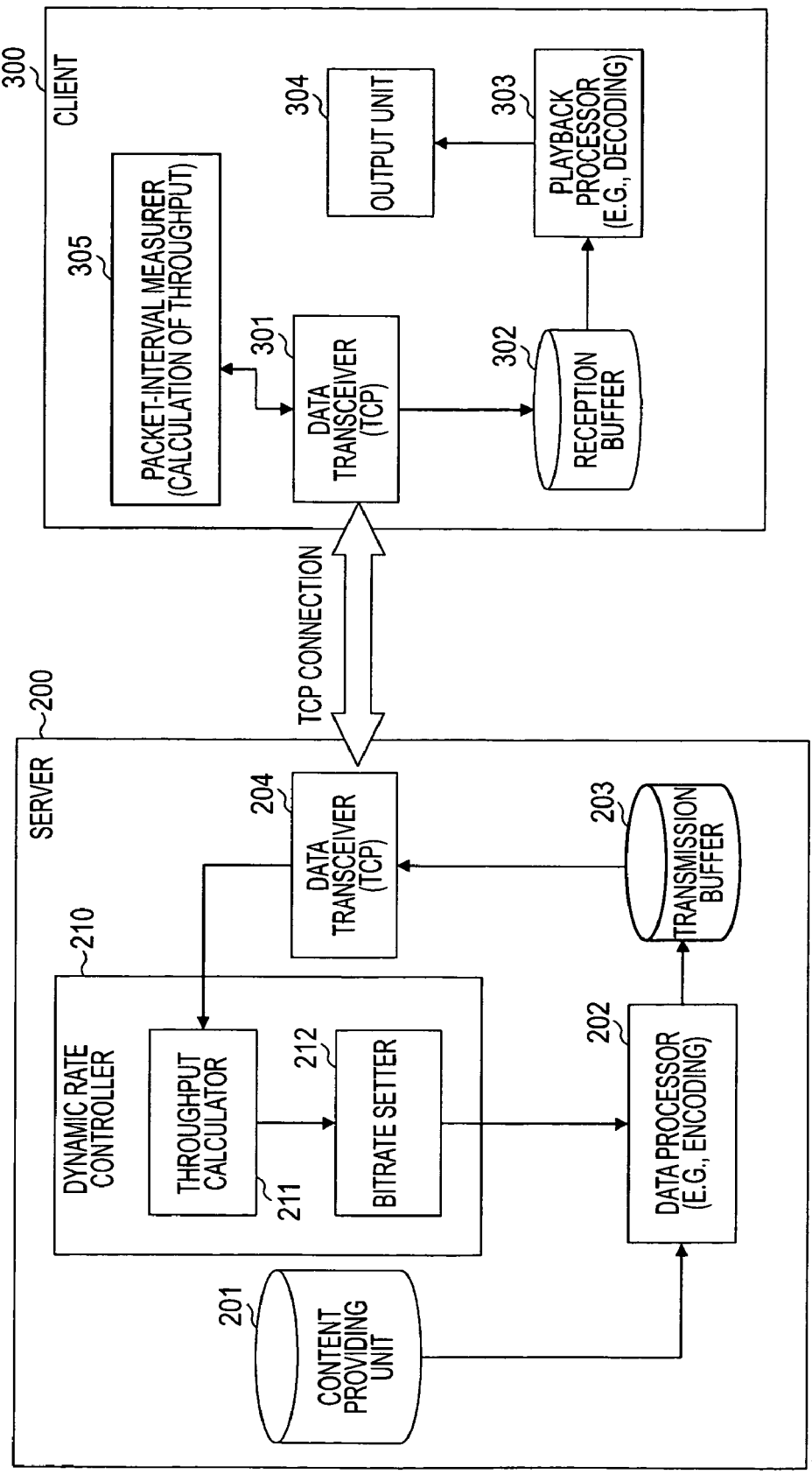
FIG. 8 is a block diagram showing the configuration of a server and a client that act as a transmitting apparatus and a receiving apparatus of streaming data in a second embodiment of the present invention.

FIG. 8 is a block diagram showing functions of a server 200 that distributes streaming data and a client 300 that receives and plays back the streaming data in the second embodiment. Communications between the server 200 and the client 300 are carried out by establishing a TCP connection.

As opposed to the configuration of the first embodiment described earlier with reference to FIG. 2, the client 300 includes a packet-interval measurer 305. The other components are substantially the same as the corresponding components shown in FIG. 2, but execute different processes. The following description will be directed mainly to points that differ from the first embodiment.

In the second embodiment, the data transceiver 204 of the server 200 successively transmits data transmission packets with the urgent flag (URG flag) set to ON (i.e., 1) at a predetermined interval. The urgent flag is usually set to ON (i.e., 1) when urgent data is included in a TCP packet. In this embodiment, regardless of the presence or absence of urgent data, packets with the urgent flag (URG flag) set to ON (i.e., 1) are successively transmitted to indicate that the packets are used to measure a reception interval of TCP packets at the client.

Now, a data communication sequence executed between a server and a client will be described with reference to FIG. 9. Similarly to the first embodiment, also in the second embodiment, streaming data is distributed from the server to the client after establishing a connection. The data communication sequence shown in FIG. 9 shows the details of the data transferring process in step S13 shown in FIG. 3, described in the context of the first embodiment.

Figure 9:
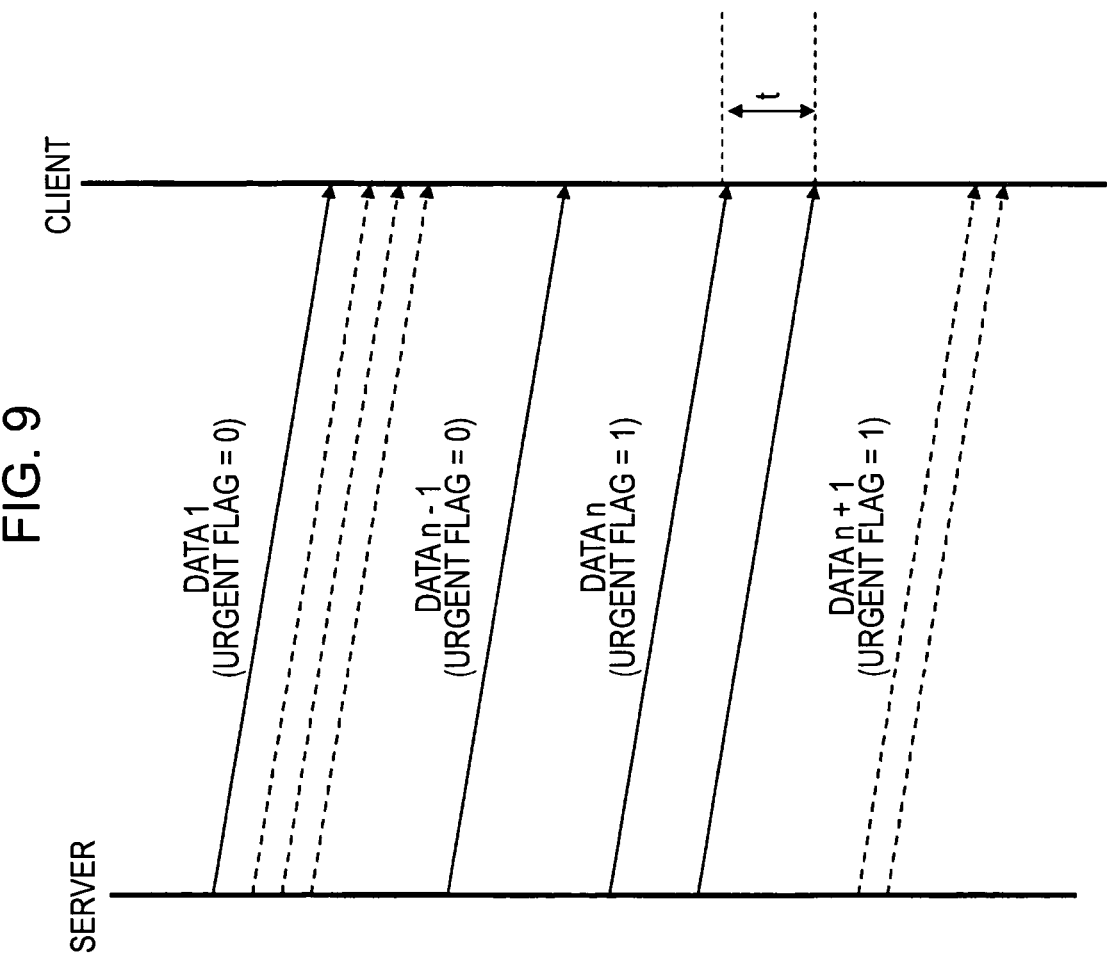
FIG. 9 is a diagram for explaining data in which an urgent flag is set, transmitted in a data transmission and reception process between the server and the client in the second embodiment of the present invention.

In the second embodiment, as shown in FIG. 9, the server transmits TCP packets to the client in order starting from data 1. The server successively transmits packets with which a packet reception interval is to be measured at the client with the urgent flag set to ON (i.e., 1). In FIG. 9, the urgent flag is set to ON (i.e., 1) in the headers of a TCP packet n and a TCP packet n+1. The successive two packets with the urgent flag set to ON (i.e., 1) are used as a pair of packets for throughput measurement.

When two packets with the urgent flag set to ON (i.e., 1) are received successively, the client measures a reception interval t of the two packets. The client calculates a throughput on the basis of the measured value, and reports the throughput to the server. Alternatively, the client may report the reception interval data t to the server so that a throughput can be calculated at the server on the basis of the reception interval data t.

The server defines a maximum throughput correspondingly to the throughput calculated on the basis of the reception interval data t of the successive packets, and controls the bitrate within a range of up to a maximum allowable corresponding to the maximum throughput. Now, the sequence of a process executed by the server and the sequence of a process executed by the client in the second embodiment will be described with reference to FIGS. 10 and 11.

Figure 10:
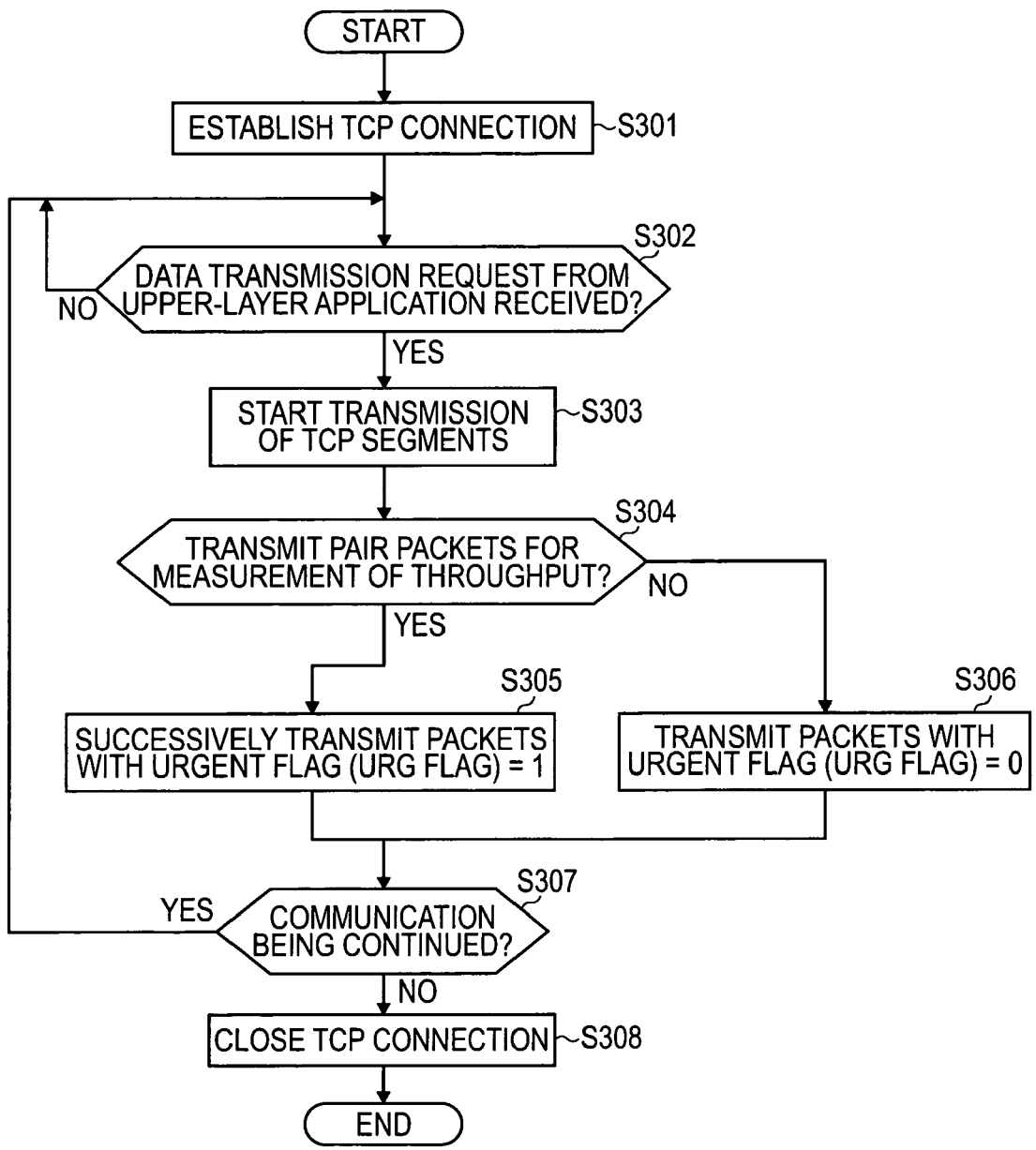
FIG. 10 is a flowchart of a sequence of a process executed by the server in the second embodiment of the present invention.

First, a process executed by the server will be described with reference to FIG. 10. FIG. 10 is a flowchart showing the flow of processing in which the server 200 establishes a TCP connection with the client, carries out communications, and closes the TCP connection.

First, in step S301, the server establishes a TCP connection with a client to which streaming data is to be distributed. When it is determined in step S302 that a data transmission request from a client application has been received, in step S303, the server starts transmission of TCP segments (packets).

In step S304, the server checks whether to transmit a pair of packets for throughput measurement to the client. When a pair of throughput packets is to be transmitted, in step S305, the server generates packets with the urgent flag set to ON (i.e., 1) and successively transmits the packet. When packets to be transmitted are not a pair of packets for throughput calculation, in step S306, the server generates and transmits packets with the urgent flag set to OFF (i.e., 0).

When it is determined in step S307 that communication is being continued, step S302 and subsequent steps are repeated. When communication is finished, the process proceeds to step S308 to close the TCP connection, and the process is then exited.

Figure 11:
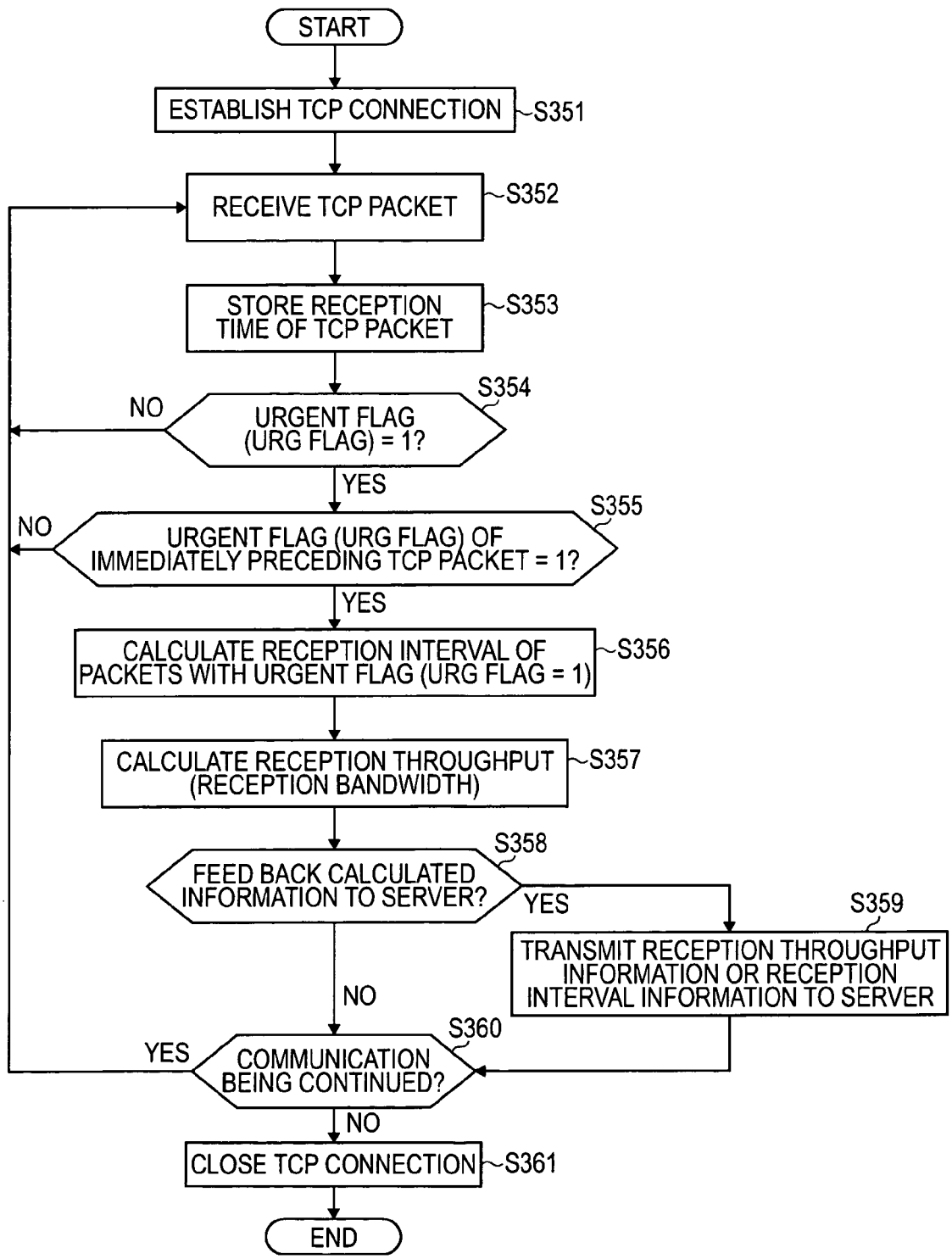
FIG. 11 is a flowchart of a process executed by the client in the second embodiment of the present invention.

Next, a process executed by the client will be described with reference to a flowchart shown in FIG. 11. FIG. 11 is a flowchart showing the process of a flow in which the client 300 establishes a TCP connection with the server, carries out communications, and closes the TCP connection.

First, in step S351, the client establishes a TCP connection with the server from which streaming data is distributed. In step S352, the client receives TCP packets transmitted from the server. In step S353, the client stores a reception time of the TCP packets in a memory.

In step S354, the client checks whether the urgent flag of a received packet is set to ON (i.e., 1). When step S354 results in NO, the process returns to step S352. When step S354 results in YES, in step S355, the client checks whether the urgent flag of an immediately preceding received packet is also set to ON (i.e., 1). When step S355 results in NO, the process returns to step S352. When step S355 results in YES, in step S356, the client calculates a reception interval t of these two packets with the urgent flag set to ON (i.e., 1). This step is executed by the packet-interval measurer 305 of the client 300 shown in FIG. 8.

In step S357, the client calculates a maximum throughput on the basis of the reception interval t of the two successive packets according to:

$$\text{Maximum throughput} = (\text{Amount of data succeeding the pair of packets})/t$$

This step is also executed by the packet-interval measurer 305.

In step S358, the client determines whether or not to feed back calculated information to the server. When it is determined not to feed back the calculated information, the client checks in step S360 whether communication is being continued. When communication is being continued, the process returns to step S352 and subsequent steps are repeated. When it is determined in step S358 to feed back the calculated information, in step S259, the calculated throughput information or reception-interval information is transmitted to the server.

After step S359, it is checked in step S360 whether communication is being continued. When communication is being continued, the process returns to step S352 and subsequent steps are repeated. When it is determined in step S360 that communication has been finished, in step S361, the TCP connection is closed.

In the case described above, when two successive packets with the urgent flag set to ON (i.e., 1) are received, the client measures a reception interval t of the two packets, calculates a throughput on the basis of the measured value, and reports the throughput to the server. Alternatively, the client may report reception interval data t to the server so that a throughput can be calculated at the server on the basis of the reception interval data t. In this case, the client need not execute step S357.

At the server, when information received from the client is reception interval data t, the throughput calculator 211 of the server calculates a maximum throughput on the basis of the reception interval data t according to the same throughput calculating equation as in the case described above, i.e.:

$$\text{Throughput} = (\text{Total data mount of the pair of packets}/2)/t$$

The bitrate setter 212 at the server inputs to the bitrate setter 212, as a maximum throughput, a throughput received from the client or a throughput calculated by the throughput calculator 211 of the server on the basis of the reception interval data t received from the client.

The process executed by the bitrate setter 212 is the same as the bitrate controlling process described earlier with reference to FIG. 7 in the context of the first embodiment. Also in this process, a maximum throughput is calculated on the basis of a reception interval of actually transmitted successive packets. That is, a maximum throughput is calculated by excluding "ineffective data transmission and reception periods" that do not contribute to data transmission and reception, such as the period B described earlier with reference to FIG. 4, and the bitrate can be controlled within a range of up to an upper limit of a maximum allowable bitrate corresponding to the maximum throughput calculated. Thus, also in the second embodiment, the bitrate is controlled according to a maximum allowable bitrate corresponding to a maximum throughput that is determined on the basis of measurement of packets that are actually transmitted successively. Accordingly, the bitrate can be controlled considering an actual transmission rate, so that data is transmitted within a range of up to an upper limit of a maximum bitrate at which data can be transmitted reliably, without excessively increasing or decreasing the bitrate.

Third Embodiment

Next, a third embodiment will be described, in which a bitrate is controlled on the basis of information that is obtained by an access point (AP).

In the network configuration shown in FIG. 1, the client (portable terminal) 123 and the client (playback apparatus) 124 carry out communications with the server 101 via the access point (AP) 131.

When a server distributes streaming data to a client via an access point (AP), the sever has to first execute a process for discovering an optimal access point (AP) between the server and the client. The AP discovering process will be described with reference to FIG. 12.

First, prior to starting streaming, in step S401, the server 200 that performs streaming distribution broadcasts an "AP discovery message" including a MAC address of the server 200 itself and a MAC address of the client 123 at a destination of streaming data within a subnet.

Figure 12:
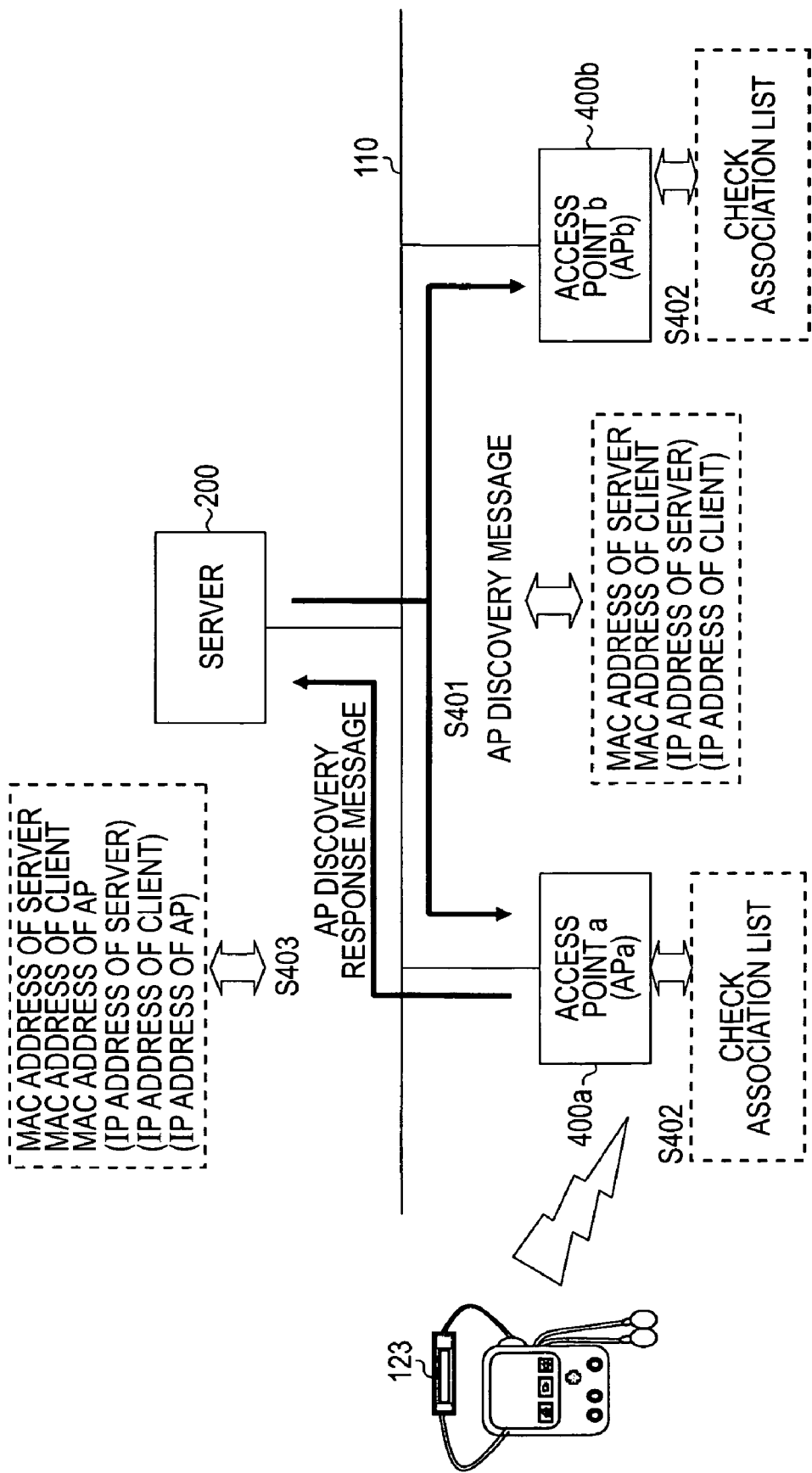
FIG. 12 is a diagram for explaining an access point (AP) discovery sequence executed by a server.

The "AP discovery message" that has been broadcasted is received by all the access points (AP) connected to a LAN. In FIG. 12, two access points 400a and 400b, namely, an access point a (APa) and an access point b (APb) are shown. Upon receiving the "AP discovery message" from the server 200, in step S402, each of the access points (APs) 400a and 400b refers to its own wireless association list to check whether a node having the client MAC address included in the "AP discovery message" exists within a wireless link".

When a node having the MAC address exists in the association list, the AP recognizes that the AP itself is on a communication path of the streaming that is taking place. Regardless of whether a node having the MAC address exists in the association list, the AP discards the "AP discovery message" without forwarding it to the wireless link.

When it is recognized that the AP is on a communication path of the streaming, in step S403, in the example shown in FIG. 12, the access point 400a (APa) unicasts to the server 200 an "AP discovery response message" including a MAC address of the access point 400a (APa) itself as well as the MAC addresses of the server 200 and the client 123. This allows the streaming distribution server 200 to recognize that a wireless link (bottleneck) exists on that path of streaming that is to be executed. When it is recognized that the AP is not on the path of streaming that is taking place, the AP does not transmit the "AP discovery response message".

In this manner, the server that distributes streaming data and an access point (AP) located on a communication path are allowed to find MAC addresses of each other. This allows communications (e.g., a report of wireless link information from the AP to the server) between the server and the access point (AP). When the relevant MAC address is deleted from the association list of the access point (AP) itself, for example, due to movement or power off of the client that receives the streaming data, the access point (AP) quits reporting wireless information to the server.

Furthermore, the server regularly transmits the "AP discovery message" during streaming as well as at the start of the streaming, so that the streaming is maintained even when the streaming client is handed over between APs. More specifically, when a handover of a streaming client occurs, upon reception of an "AP discovery message" by a new AP accessed by the streaming client, the AP returns an "AP discovery response message" to the server and starts reporting the status of a wireless link. The MAC address of the streaming client is deleted from the association list of an AP that had been accessed before the handover takes place, and this AP quits reporting wireless link information to the server.

When the report from the access point (AP) to the server is based on messages of an upper layer (the IP layer) instead of messages of the layer 2 (the data link layer), IP addresses are included as well as MAC addresses in the "AP discovery message" and the "AP discovery response message". Instead of the "AP discovery response message", the access point (AP) may report wireless link information immediately.

Through the AP discovery process described above, a relationship between the server, the access point (AP), and the client involved in streaming distribution is configured. In the third embodiment, the server that executes streaming distribution controls a bitrate on the basis of information obtained by the access point (AP) on a path of the streaming distribution.

Figure 13:
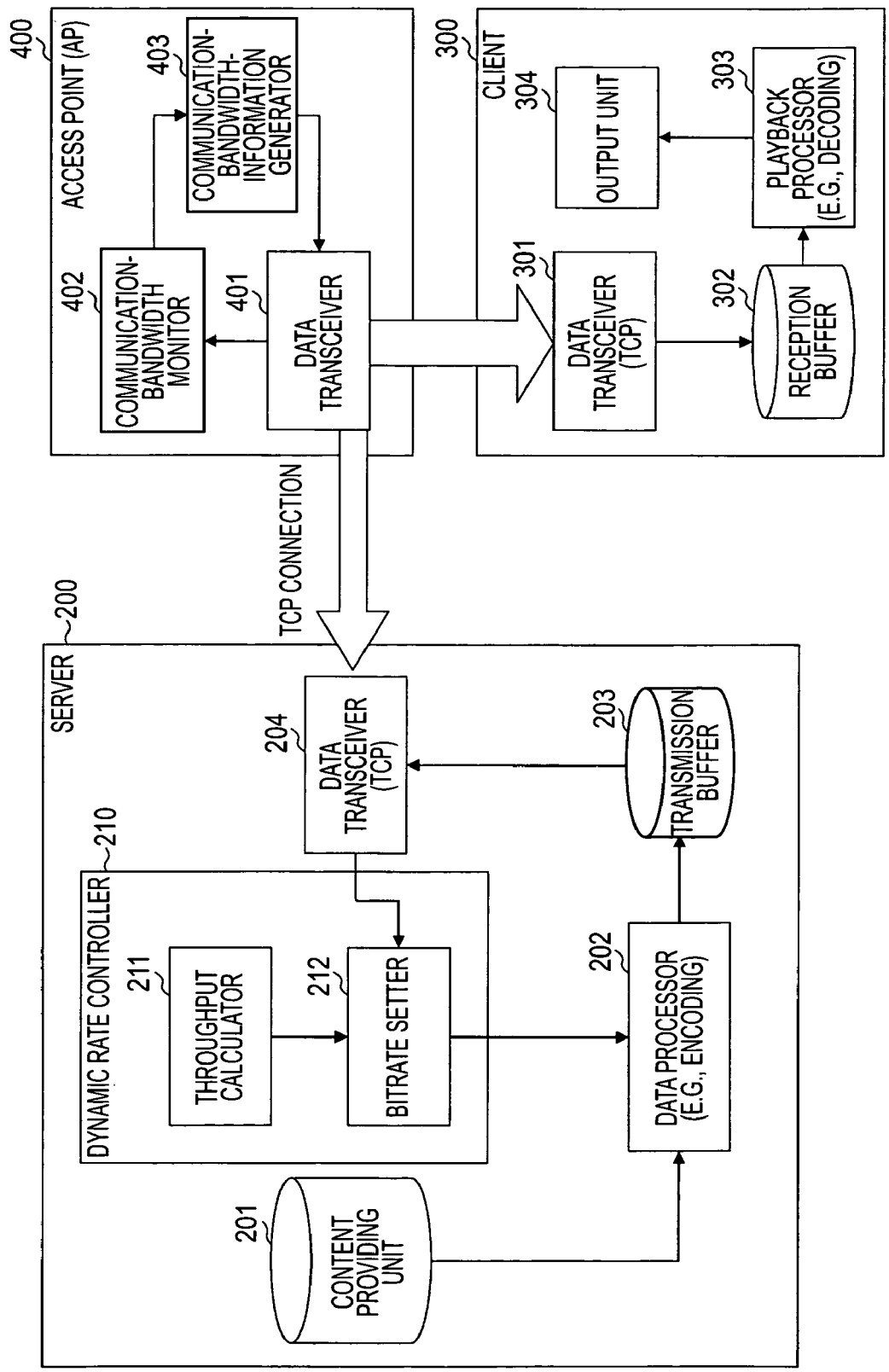
FIG. 13 is a block diagram showing the configurations of a server and a client that act as a transmitting apparatus and a receiving apparatus in a third embodiment of the present invention.

Now, the functions of the server 200 that distributes streaming data, the client 300 that receives and plays back the streaming data, and the access point (AP) 400 existing on the path of the streaming in the third embodiment will be described with reference to FIG. 13. The server 200 and the client 300 carry out communications by establishing a TCP connection via the access point (AP) 400.

The configurations of the server 200 and the client 300 are the same as those in the first embodiment described with reference to FIG. 2. However, the process executed by the server 200 differs. A shown in FIG. 13, the access point (AP) 400 includes a data transceiver 401, a communication-bandwidth monitor 402, and a communication-bandwidth information generator 403.

In the access point (AP) 400, the communication-bandwidth monitor 402 monitors values such as a round trip time (RTT), a received signal strength indicator (RSSI), and a transmission rate in the layer 2 (data link layer) of the wireless communication link. The RTT refers to a time that is taken from transmission of a packet from the access point (AP) 400 to reception of a response from the client. The monitoring operation by the communication-bandwidth monitor 402 of the access point (AP) 400 is executed regularly.

The communication link information obtained by the communication-bandwidth monitor 402 is processed by the communication-bandwidth-information generator 403 as needed for reporting to the server. For example, the data processing involves calculation of weighted averages or standard deviations. A weighted averages or a standard deviation is calculated for each value such as RTT, RSSI, and transmission rate to generate values to be reported to the server. The data generated by the communication-bandwidth-information generator 403 is reported to the server 200 via the data transceiver 401 and a communication network.

The communication-bandwidth information transmitted from the access point (AP) 400 to the server 200 is received by the data transceiver 204 of the server 200 and is input to the bitrate setter 212 of the dynamic rate controller 210. The bitrate setter 212 analyzes the communication-bandwidth information obtained from the access point (AP) 400 according to a checking algorithm. The bitrate setter 212 immediately decreases the bitrate when it is determined that the bitrate of streaming data is to be decreased.

The checking algorithm involves, for example, comparison of the communication-bandwidth information obtained from the access point (AP) 400 with thresholds held in the bitrate setter 212. More specifically, for example, the bitrate is decreased when parameters included in the communication-bandwidth information received from the access point (AP) 400, such as weighted averages or standard deviations of RTT, RSSI, and transmission rate, exceed the corresponding thresholds held in the bitrate setter 212 N times in succession. The comparison against the thresholds is executed a number of times in order to prevent decreasing the bitrate meaninglessly, for example, when the parameters accidentally exceed the corresponding thresholds only once.

Figure 14:
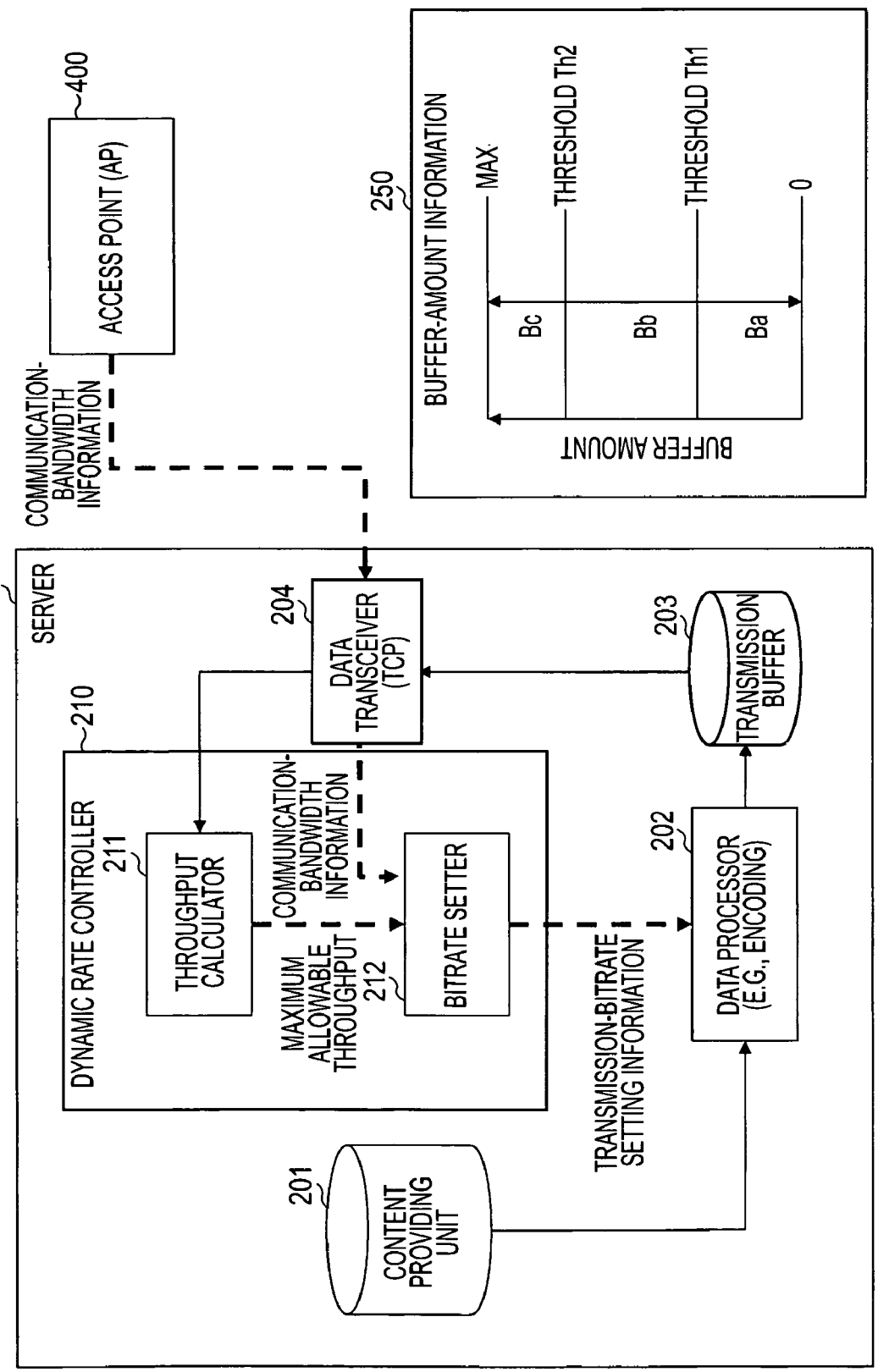
FIG. 14 is a diagram for explaining a sequence of a process executed by a bitrate setter in the third embodiment of the present invention.
Figure 15:
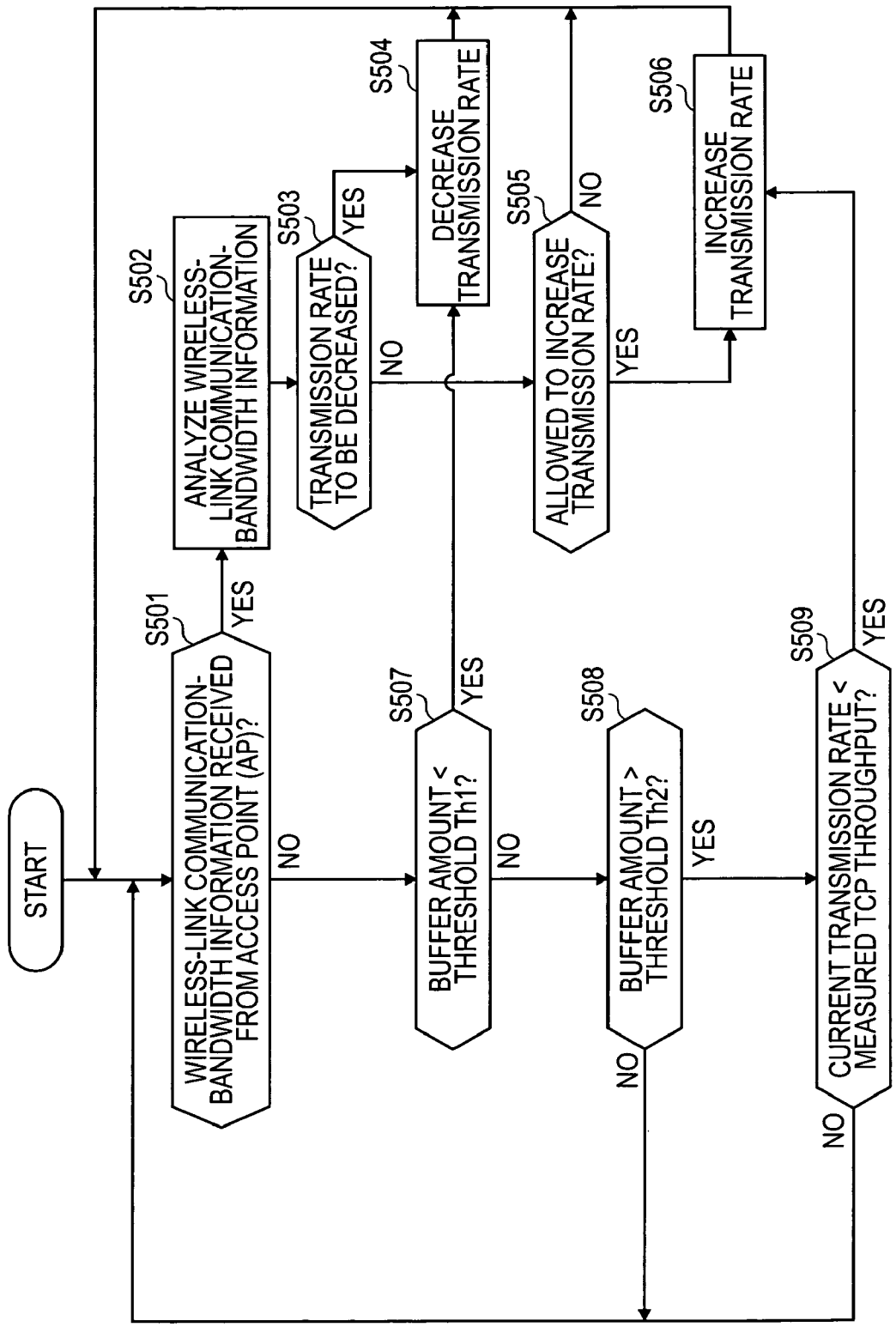
FIG. 15 is a flowchart of a sequence of a process executed by the bitrate setter in the third embodiment of the present invention.

The process executed by the bitrate setter 212 in the third embodiment will be described with reference to FIGS. 14 and 15. In the third embodiment, the bitrate is controlled by a combination of a throughput calculating process according to the first or second embodiment. Referring to FIG. 14, the bitrate setter 212 receives input of a maximum throughput calculated by the process according to the first or second embodiment, and also receives input of communication-bandwidth information obtained from the access point (AP) 400, i.e., parameters such as weighted averages or standard deviations of RTT, RSSI, and transmission rate of wireless communications between the access point and the client. Furthermore, the bitrate setter 212 executes the process of estimating the client buffer amount described earlier to determine a bitrate, and inputs transmission-bitrate setting information to the data processor 202 that executes encoding or selection of encoded data. As indicated by the buffer-amount information 250 in FIG. 14, the estimated client buffer amount obtained by the bitrate setter 212 is in a range of 0 to MAX.

Now, the sequence of the process executed by the bitrate setter 212 will be described with reference to a flowchart shown in FIG. 15. In step S501, the bitrate setter 212 checks whether communication-bandwidth information has been input from the access point (AP) 400. The communication-bandwidth information refers to parameters such as weighted averages or standard deviations of RTT, RSSI, and transmission rate. When it is determined in step S501 that communication-bandwidth information has been input from the access point (AP) 400, in step S502, the bitrate setter 212 analyzes the communication-bandwidth information input from the access point 400 (AP).

The analysis in step S502 involves, for example, comparison of the communication-bandwidth information obtained from the access point (AP) 400 with thresholds held by the bitrate setter 212, as described earlier. For example, parameters obtained from the access point (AP) 400, such as weighted averages or standard deviations of RTT, RSSI, and transmission rate of wireless communications between the base station and the client, are compared with the thresholds held by the bitrate setter 212.

In step S503, it is checked on the basis of the result of analysis in step S502 whether the transmission bitrate is to be decreased. When it is determined that the transmission bitrate is to be decreased, in step S504, the bitrate setter 212 decreases the transmission bitrate. Furthermore, in step S505, the bitrate setter 212 checks on the basis of the result of analysis in step S502 whether it is possible to increase the transmission bitrate. When it is determined that it is possible to increase the transmission bitrate, in step S506, the bitrate setter 212 increases the transmission bitrate. However, it is not allowed to increase the bitrate beyond an upper limit of a maximum allowable bitrate corresponding to a maximum throughput calculated by the throughput calculator 211. The upper limit is a maximum allowable bitrate corresponding to a maximum throughput calculated by the throughput calculator 211 or by a client, described in the context of the first and second embodiments.

In checking whether the transmission bitrate is to be decreased or increased on the basis of the analysis of the communication-bandwidth information obtained from the access point (AP) 400 in steps S503 and S504, as described earlier, the bitrate setter 212 determines the bitrate is to be changed when similar results are observed a number of times successively by comparison of parameters obtained from the access point (AP) 400, such as weighted averages or standard deviations of RTT, RSSI, and transmission rate of wireless communications between the access point and the client, with the thresholds held by the bitrate setter 212.

For example, when the RTT of wireless communications between the access point and client is maintained to be longer than a threshold a for a certain period, the transmission rate is decreased. When the RTT is maintained to be shorter than a threshold b for a certain period, the transmission bitrate is increased. When the received signal strength indicator (RSSI) of wireless communications between the access point and the client is maintained to be higher than a threshold c for a certain period, the transmission rate is increased. When the RSSI is maintained to be lower than a threshold d for a certain period, the transmission bitrate is decreased. When the bitrate of wireless communications between the access point and the client is maintained to be lower than a threshold e for a certain period, the transmission bitrate is decreased. When the bitrate is maintained to be higher than a threshold f for a certain period, the transmission rate is increased.

In steps S507 to S509, the bitrate is controlled on the basis of the estimated buffer amount, similarly to the first embodiment. More specifically, in step S507, the bitrate setter 212 checks whether the buffer amount is less than the predetermined threshold Th1. When it is determined that the buffer amount is less than the predetermined threshold Th1, in step S504, the bitrate setter 212 decreases the transmission bitrate. This step is executed when the buffer amount is in a range Ba of the buffer-amount information 250 shown in FIG. 14.

When it is determined in step S507 that the buffer amount is not less than the predetermined threshold Th1, in step S508, the bitrate setter 212 checks whether the buffer amount is greater than the predetermined threshold Th2. When it is determined that the buffer amount is greater than the predetermined threshold Th2, the process returns to step S501. This step is executed when the buffer amount is in a range Bb of the buffer-amount information 250 shown in FIG. 6.

When it is determined that the buffer amount is greater than the predetermined threshold Th2, in step S506, the current bitrate of transmission data is compared with a maximum allowable bitrate corresponding to a maximum throughput calculated by the throughput calculator 211 through the process according to the first embodiment or a maximum throughput calculated by the client or the throughput calculator 211 through the process according to the second embodiment. When the current bitrate of transmission data is less than the maximum allowable bitrate corresponding to the maximum throughput, in step S506, the bitrate of transmission data is increased. However, it is not allowed to increase the bitrate beyond the maximum allowable bitrate. When the current bitrate of transmission data is equal to the maximum allowable bitrate corresponding to the maximum throughput, the process returns to step S501 without changing the bitrate. This occurs when the buffer amount is in a range Bc of the buffer-amount information 250 shown in FIG. 14.

In the third embodiment, in addition to the bitrate control based on the maximum throughput calculated through the throughput calculating process according to the first or second embodiment, the bitrate is also controlled on the basis of communication-bandwidth information representing parameters measured by the access point (AP), such as the RTT, RSSI, and transmission rate of wireless communication between the access point and the client. This allows controlling the bitrate in accordance with change in communication status of wireless communications. Furthermore, similarly to the first and second embodiments, a throughput calculated on the basis of an effective data transmission and reception period is used as a maximum throughput. Thus, it is possible to control the bitrate in consideration of an actual transmission rate. Accordingly, it is possible to transmit data within a range of up to an upper limit of a maximum bitrate at which data can be transmitted reliably, without excessively increasing or decreasing the bitrate.

When it is determined on the basis of communication-bandwidth information of wireless communications between the access point and the client, measured by the access point (AP), that it is difficult to maintain distribution of streaming data between the server and the client, the server or the access point (AP) may notify the client that it has become difficult to maintain distribution of streaming data. In this case, the client displays the notification on a display to notify the user that it has become difficult to maintain data distribution. Thus, the user can take appropriate measures, for example, placing the client terminal nearer to the access point (AP) or stopping a device causing the problem, such as a microwave oven.

Example Hardware Configuration of the Server, Access Point (AP), and Client

Next, an example hardware configuration of the server, access point (AP), and client will be described with reference to FIG. 16. As described with reference to FIG. 1, the server and client can be implemented by various devices. FIG. 16 shows an example hardware configuration of the server, access point (AP), and client.

The hardware configuration shown in FIG. 16 will be described. A central processing unit (CPU) 501 executes various processes according to programs stored in a read-only memory (ROM) 502 or a recording medium 514 such as a hard disc drive (HDD), so that it functions as a data processor or a communication controller. A random access memory (RAM) 503 stores programs executed by the CPU 501 or data as needed. The CPU 501, the ROM 502, and the RAM 503 are connected to each other via a bus 521.

The bus 521 is connected to an input/output interface 522. The input/output interface 522 is connected to an input unit 511 operated by a user, such as a keyboard, switches, buttons, a pointing device, or a mouse, and to an output unit for presenting various information to the user, such as a liquid crystal display, a cathode ray tube display, or a speaker. Furthermore, the input/output interface 522 is connected to a communication unit 506 that functions as a data transceiver, and to a drive 513 that reads data from or writes data to a recording medium 514 mounted thereon, such as a magnetic disc, an optical disc, a magneto-optical disc, or a semiconductor memory. However, the input unit 511, the output unit 512, the drive 513, the recording medium 514, and so forth are not necessarily needed in the access point (AP), as long as components sufficient to allow various setting are provided.

The configuration shown in FIG. 16 is an example of an apparatus that can be used as the server, access point (AP), and client connected via the network as shown in FIG. 1. However, without limitation to the configuration shown in FIG. 16, various electronic apparatuses and information processing apparatuses can be connected to a network. These devices may individually have their specific hardware configurations.

The present invention has been described in detail in the context of specific embodiments. However, obviously, it is possible for those skilled in the art to make modifications or alternatives without departing from the spirit of the present invention. That is, the present invention has been disclosed by way of examples, and the present invention should not be construed as limited to the embodiments. The scope of the present invention should be determined on the basis of the claims.

The series of processes described herein can be executed by hardware, by software, or by combination of hardware and software. When the series of processes is executed by software, a program defining the processing sequences is executed by installing it on a memory of a computer embedded in special hardware or on a general-purpose computer that is capable of executing various processes.

For example, the program may be recorded in a recording medium such as a hard disc or a read-only memory (ROM). Alternatively, the program may be stored (recorded) temporarily or permanently on a removable recording medium such as a flexible disc, a compact disc read-only memory (CD-ROM), a magneto-optical (MO) disc, a digital versatile disc (DVD), a magnetic disc, or a semiconductor memory. Such a removable medium can be provided in the form of what is called package software.

Instead of installing the program from a removable recording medium to a computer, the program may be transferred by wireless from a download site to a computer, or transferred by wire to a computer via a network such as a local area network (LAN) or the Internet, so that the computer can receive the program transferred and install the program on an internal recording medium such as a hard disc.

The various processes described herein need not necessarily be executed sequentially in the orders described, and may be executed in parallel or individually as needed or in accordance with the processing ability of an apparatus that executes the processes. A system in this specification refers to a logical combination of a plurality of apparatuses, irrespective of whether individual constituent components are provided within the same case.

What is claimed is:

1. A communication processing method of a client that receives data, the method comprising:
    measuring a reception interval of packets received successively from a server, according to identification information included in the packets, the identification information corresponding to urgent flags set by the server in the headers of the packets according to a predetermined interval; and
    selectively transmitting, to the server, packet-reception-interval information representing the reception interval or throughput information calculated based on the reception interval.

2. A communication processing apparatus that acts as a client for receiving data from a server, the apparatus comprising:
    a data transceiver configured to carry out communications with the server; and
    a packet-interval measurer configured to measure, using one or more processors, a reception interval of data packets received successively from the server;
    wherein the packet-interval measurer is configured to measure the reception interval according to identification information included in the data packets, the identification information corresponding to urgent flags set by the server in the headers of the data packets according to a predetermined interval, and to selectively transmit reception-interval information representing the reception interval or throughput information calculated based on the reception interval to the server via the data transceiver.

3. A data communication system comprising a server and a client that transmit and receive data,
    wherein the client is configured to measure, using one or more processors, a reception interval of packets received successively from the server, according to identification information included in the packets, the identification information corresponding to urgent flags set by the server in the headers of the packets according to a predetermined interval, and to selectively transmit reception-interval information representing the reception interval or throughput information calculated based on the reception interval to the server, and wherein the server is configured to set a transmission bitrate to a value not exceeding a maximum allowable bitrate corresponding to a maximum throughput that is calculated based on the throughput information or the reception-interval information received from the client, and to transmit data to the client according to the transmission bitrate.

4. The data communication system according to claim 3, wherein the server is configured to receive communication-bandwidth information from an access point that acts as an intermediary for communications with the client, the communication-bandwidth information relating to a communication bandwidth between the access point and the client, and to determine the transmission bitrate based on the communication-bandwidth information.

5. A communication processing apparatus that acts as a server for transmitting data to a client, the apparatus comprising:
   a data transceiver configured to carry out communications with the client;
   a rate controller configured to control and determine, using one or more processors, a bitrate of data transmitted to the client; and
   a data processor configured to prepare data to transmit in accordance with the bitrate;
   wherein the rate controller includes
      a throughput calculator configured
         to extract a data transmission and reception period from a connected period during which a communication connection is maintained between the server and the client, the data transmission and reception period corresponding to a period from a start of successive data transmission based on a window size received from the client, to reception of a reception acknowledgement for the successively transmitted data, the window size related to a buffer size, and the data transmission and reception period excluding a wait period in the connected period, and
         to calculate a maximum throughput based on a length of the data transmission and reception period and an amount of data transmitted; and
      a bitrate setter configured to set a transmission bitrate to a value not exceeding a maximum allowable bitrate corresponding to the maximum throughput.

6. The communication processing apparatus according to claim 5, wherein the throughput calculator is configured to obtain a plurality of pieces of sample data associated with a plurality of data transmission and reception periods, and to calculate a maximum throughput based on the plurality of pieces of sample data excluding pieces of data determined as having exceptional values among the plurality of pieces of sample data obtained.

7. The communication processing apparatus according to claim 5, wherein the bitrate setter is configured to set a bitrate based on an estimated buffer amount of a client buffer, and to increase the bitrate to a value not exceeding the maximum allowable bitrate when the estimated buffer amount is greater than or equal to a predetermined threshold.

8. The communication processing apparatus according to claim 7, wherein the bitrate setter is configured to calculate the estimated buffer amount according to an equation expressed as the estimated buffer amount of the client buffer=$B\_cli+D\_serv-R*T$, using the following information (a) to (d):
   (a) a buffer amount $B\_cli$, expressed in bytes, reported from the client at a start time of communication;
   (b) a time T, expressed in seconds, elapsed since a start of playback by the client;
   (c) an amount $D\_serv$, expressed in bytes, of data transmitted from the server during the elapsed time T since the start of playback by the client; and
   (d) a playback rate R, expressed in bytes per second, of content that is obtainable from content transmitted.

9. The communication processing apparatus according to claim 5,
   wherein the data transceiver is configured to receive communication-bandwidth information from an access point that acts as an intermediary for communications with the client, the communication-bandwidth information relating to a communication bandwidth between the access point and the client, and
   wherein the bitrate setter is configured to set the transmission bitrate based on—the communication-bandwidth information.

10. The communication processing apparatus according to claim 9, wherein the communication-bandwidth information includes information that is generated based on data relating to at least one of a round trip time, a received signal strength indicator, and a transmission rate of communications between the access point and the client.

11. A communication processing apparatus that acts as a server for transmitting data to a client, the apparatus comprising:
   a data transceiver configured to carry out communications with the client and to successively transmit, at a predetermined interval, packets having packet headers with urgent flags set to a specific value, the urgent flags serving as identification information of the packets;
   a rate controller configured to control and determine, using one or more processors, a bitrate of data transmitted to the client; and
   a data processor configured to prepare data to transmit in accordance with the bitrate determined by the rate controller;
   wherein the rate controller includes a bitrate setter configured to calculate a maximum throughput based on reception-interval information selectively measured and relayed by the client using the successively transmitted packets in a connected period during which a communication connection is maintained between the server and the client, and to set a transmission bitrate to a value not exceeding a maximum allowable bitrate corresponding to the maximum throughput.

12. The communication processing apparatus according to claim 11,
   wherein the rate controller includes a throughput calculator configured to receive from the client the reception-interval, and to calculate a maximum throughput based on the reception-interval information and an amount of data transmitted, and
   wherein the bitrate setter is configured to set a transmission bitrate to a value not exceeding a maximum allowable bitrate corresponding to the maximum throughput.

13. The communication processing apparatus according to claim 11, wherein the bitrate setter is configured to set a bitrate based on transition of an estimated buffer amount of a client buffer, and to increase the bitrate to a value not exceeding the maximum allowable bitrate when the estimated buffer amount is greater than or equal to a predetermined threshold.

14. The communication processing apparatus according to claim 13, wherein the bitrate setter is configured to calculate the estimated buffer amount according to an equation expressed as the estimated buffer amount of the client buffer=B_cli+D_sery−R*T, using the following information (a) to (d):
  (a) a buffer amount B_cli, expressed in bytes, reported from the client at a start time of communication;
  (b) a time T, expressed in seconds, elapsed since a start of playback by the client;
  (c) an amount D_serv, expressed in bytes, of data transmitted from the server during the elapsed time T since the start of playback by the client; and
  (d) a playback rate R, expressed in bytes per second, of content that is obtainable from content transmitted.

15. The communication processing apparatus according to claim 11,
  wherein the data transceiver is configured to receive communication-bandwidth information from an access point that acts as an intermediary for communications with the client, the communication-bandwidth information relating to a communication bandwidth between the access point and the client, and
  wherein the bitrate setter is configured to set the transmission bitrate based on the communication-bandwidth information.

16. The communication processing apparatus according to claim 15, wherein the communication-bandwidth information includes information that is generated based on data relating to at least one of a round trip time, a received signal strength indicator, and a transmission rate of communications between the access point and the client.

17. A communication processing method of a server that transmits data, the method comprising:
  controlling and determining a bitrate of data transmitted to a client; and
  preparing data to transmit in accordance with the bitrate;
  wherein controlling and determining the bitrate includes
    extracting a data transmission and reception period excluding a wait period, the data transmission and reception period and the wait period occurring in a connected period during which a communication connection is maintained between the server and the client, associating the data transmission and reception period to a period from a start of successive data transmission based on a window size received from the client, to reception of a reception acknowledgement for the successively transmitted data, the window size related to a buffer size, and calculating a maximum throughput based on a length of the data transmission and reception period and an amount of data transmitted; and
    setting a transmission bitrate to a value not exceeding a maximum allowable bitrate corresponding to the maximum throughput.

18. The communication processing method according to claim 17, wherein calculating the maximum throughput includes obtaining a plurality of pieces of sample data associated with a plurality of data transmission and reception periods, and calculating the maximum throughput based on the plurality of pieces of sample data excluding pieces of data determined as having exceptional values among the plurality of pieces of sample data obtained.

19. The communication processing method according to claim 17, wherein setting the transmission bitrate includes setting the transmission bitrate based on transition of an estimated buffer amount of a client buffer, and increasing the transmission bitrate to a value not exceeding the maximum allowable bitrate corresponding to the maximum throughput when the estimated buffer amount is greater than or equal to a predetermined threshold.

20. The communication processing method according to claim 19, wherein setting the transmission bitrate includes calculating the estimated buffer amount of the client buffer through an equation expressed as the estimated buffer amount of the client buffer=B_cli+D_sery−R*T, using the following information (a) to (d):
  (a) a buffer amount B_cli, expressed in bytes, reported from the client at a start time of communication;
  (b) a time T, expressed in seconds, elapsed since a start of playback by the client;
  (c) an amount D_serv, expressed in bytes, of data transmitted from the server during the elapsed time T since the start of playback by the client; and
  (d) a playback rate R, expressed in bytes per second, of content that is obtainable from content transmitted.

21. The communication processing method according to claim 17, further comprising receiving communication-bandwidth information from an access point that acts as an intermediary for communications with the client, the communication-bandwidth information relating to a communication bandwidth between the access point and the client,
  wherein setting the transmission bitrate includes setting the transmission bitrate based on the communication-bandwidth information.

22. The communication processing method according to claim 21, wherein the communication-bandwidth information includes information that is generated based on data relating to at least one of a round trip time, a received signal strength indicator, and a transmission rate of communications between the access point and the client.

23. A communication processing method of a server that transmits data, the method comprising:
  controlling and determining a bitrate of data transmitted to a client; and
  preparing data to transmit in accordance with the bitrate;
  wherein controlling and determining the bitrate include:
    successively transmitting data packets with headers including urgent flags, at a predetermined interval, the urgent flags set to a specific value serving as identification information associated with the data packets;
    defining a maximum throughput calculated in accordance with reception-interval information of the data packets that are transmitted successively in a connected period during which a communication connection is maintained between the server and the client, and
    setting a transmission bitrate to a value not exceeding a maximum allowable bitrate corresponding to the maximum throughput,
      wherein controlling and determining the bitrate further includes selectively receiving, from the client, the reception-interval information, and calculating the maximum throughput based on the reception-interval information and an amount of data transmitted.

24. The communication processing method according to claim 23, wherein setting the transmission bitrate includes setting the transmission bitrate based on transition of an estimated buffer amount of a client buffer, and increasing the transmission bitrate to a value not exceeding the maximum allowable bitrate corresponding to the maximum throughput when the estimated buffer amount is greater than or equal to a predetermined threshold.

25. The communication processing method according to claim 24, wherein setting the transmission bitrate includes calculating the estimated buffer amount according to an equation expressed as the estimated buffer amount of the client buffer=B_cli+D_sery−R*T, using the following information (a) to (d):
- (a) a buffer amount B_cli, expressed in bytes, reported from the client at a start time of communication;
- (b) a time T, expressed in seconds, elapsed since a start of playback by the client;
- (c) an amount D_serv, expressed in bytes, of data transmitted from the server during the elapsed time T since the start of playback by the client; and
- (d) a playback rate R, expressed in bytes per second, of content that is obtainable from content transmitted.

26. The communication processing method according to claim 23, further comprising receiving communication-bandwidth information from an access point that acts as an intermediary for communications with the client, the communication-bandwidth information relating to a communication bandwidth between the access point and the client,
wherein setting the transmission bitrate includes setting the transmission bitrate based on the communication-bandwidth information.

27. The communication processing method according to claim 26, wherein the communication-bandwidth information includes information that is generated based on data relating to at least one of a round trip time, a received signal strength indicator, and a transmission rate of communications between the access point and the client.

* * * * *